US006866829B2

(12) United States Patent  (10) Patent No.: US 6,866,829 B2
Okihara et al.  (45) Date of Patent: Mar. 15, 2005

(54) OZONIZER

(75) Inventors: Yujiro Okihara, Tokyo (JP); Youichiro Tabata, Tokyo (JP); Akaru Usui, Tokyo (JP); Hiromichi Komiya, Tokyo (JP); Yuji Ganryu, Tokyo (JP); Masaki Kuzumoto, Tokyo (JP); Noboru Wada, Tokyo (JP); Koji Ohta, Tokyo (JP); Shigenori Yagi, Tokyo (JP); Hirozoh Kanegae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 287 days.

(21) Appl. No.: 10/155,068

(22) Filed: May 28, 2002

(65) Prior Publication Data

US 2004/0052701 A1 Mar. 18, 2004

(30) Foreign Application Priority Data

Nov. 22, 2001 (JP) ........................................ 2001-357861

(51) Int. Cl.⁷ .............................................. B01J 19/08
(52) U.S. Cl. ................................ 422/186.2; 422/186.07
(58) Field of Search ........................... 422/186.07, 186.2

(56) References Cited

U.S. PATENT DOCUMENTS 3,973,133 A  8/1976  Emigh et al.
4,666,679 A  5/1987  Masuda et al.
5,932,180 A  8/1999  Zhang et al.
6,093,289 A  7/2000  Kuzumoto et al.
2001/0041154 A1  11/2001  Murata et al.

FOREIGN PATENT DOCUMENTS

| EP | 1 167 287 A1 | 1/2002 |
| JP | 8-12304 | 1/1996 |
| JP | 2000-281318 | 10/2000 |
| RU | 2147010 | 3/2000 |

*Primary Examiner*—Kishor Mayekar
(74) *Attorney, Agent, or Firm*—Leydig, Voit & Mayer, Ltd.

(57) ABSTRACT

An ozonizer has a flat plate-shaped low voltage electrode 7, a flat plate-shaped high voltage electrode 3 facing a main surface of the low voltage electrode 7. The ozonizer also has a flat plate-shaped dielectric 5 and a spacer for forming a discharge gap 6 of a thin thickness in a laminating direction provided between the low voltage electrode 7 and the electrode 3, an electrode cooling sheet 1 provided facing a main surface of the electrode 3 at a side opposite the discharge gap 6 for cooling the electrode 3. The ozonizer also has a thermal conducting/electric insulating sheet 2 sandwiched between the electrode 3 and the electrode cooling sheet 1. An alternating voltage is applied between the low voltage electrode 7 and the electrode 3 and a discharge is produced in the discharge gap 6 injected with oxygen gas to produce ozone gas.

19 Claims, 18 Drawing Sheets

OZONIZER

BACKGROUND OF THE INVENTION

1. Field of the Invention

The present invention relates to a flat plate laminate ozone generating apparatus including a plurality of laminated plate-shaped high voltage electrodes and low voltage electrodes between which an alternating voltage is applied to produce a discharge and generate ozone gas, and in particular, to an ozonizer which is an essential portion of the flat plate laminate ozone generating apparatus and which includes the high voltage electrodes and low voltage electrodes and to which oxygen is supplied to generate ozone gas.

2. Description of the Related Art

FIG. 27 is a cross sectional drawing of a conventional ozonizer described in, for example, Japanese Patent Publication No. 3113885 "Discharge Cell for Ozone Generator". In a conventional ozonizer, as shown in FIG. 27, a plurality of low voltage electrodes 7 composed of approximately flat plate-shaped rigid bodies sandwich a pair of block(s) 25 on both sides and are superposed in a thickness direction of the plates to construct a number of electrode module laminated bodies. The electrode module laminated bodies are secured between an electrode presser plate 22 and a base 24 by means of a plurality of fastening bolts 21 passing through both side portions thereof in the laminating direction.

Each electrode module comprises a pair of upper and lower low voltage electrodes 7, a pair of bilateral blocks 25 sandwiched between the low voltage electrodes 7, 7, dielectric unit(s) 30 disposed between the low voltage electrodes 7, 7 and situated at an inner side of the blocks 25, 25 and a plurality of elastic spacers 26 for forming a plurality of discharge gaps provided for forming discharge gap(s) 6 at both sides of the dielectric unit(s) 30. The elastic spacers 26 constitute rod-shapes of a circular cross-section extending in a direction orthogonal to the page.

The pair of bilateral blocks 25 is a rigid body of a conductive plate material such as stainless steel plate(s), and, by intervening the blocks between both side portions of the low voltage electrodes 7, a space of an equal gap amount is formed in the thickness direction of the block(s).

Also, (all of) the drawings are expanded in the vertical direction and an actual thickness is made extremely thin, for example, 3 mm or less in the case of the low voltage electrode 7 and 3 mm or less in the case of the block 25.

Cooling water passages 9 are formed inside the pair of upper and lower low voltage electrodes 7 and combine as a heat sink. Moreover, a cooling water passage 9 is also formed in blocks 25 of one side. The cooling water passages 9 inside the low voltage electrodes 7 are communicated with a cooling water inlet/outlet 12 provided in the base 24 via the blocks 25 in order to circulate cooling water as a coolant.

On the other hand, an ozone gas passage 8 is formed in a main surface of the low voltage electrode 7 facing the discharge gap 6 by means of, for example, etching and the like. The ozone gas passage 8 is communicated with an ozone gas outlet 11 provided in the base 24 via an ozone gas passage 8 formed in the blocks 25. Also, an oxygen gas inlet 10 for supplying oxygen gas to the discharge gaps 6 along a direction orthogonal to the page surface is provided at both side portions of discharge gaps 6.

The dielectric unit(s) 30 disposed in the space surrounded by the upper and low voltage electrodes 7 and the bilateral blocks 25 is a thin sheet shaped rigid body comprising a sandwiched structure of a high voltage electrode 3 sandwiched between a pair of upper and lower glass plates 5. The high voltage electrode 3 is a conductive thin sheet such as a stainless steel sheet and the like and a portion thereof is led outside as a feed terminal (not shown).

The discharge gap forming elastic spacers 26 provided for forming the discharge gap 6 at both sides of the dielectric unit 30 are thin resin wire rods of a circular cross-section having ozone resistance properties and resiliency, and are disposed in the discharge gaps at a predetermined interval. A thickness of each elastic spacer 26 (outside diameter) is set to be 5–6% larger than each gap amount of the discharge gaps 6 in a non-compressed state.

With such a setting, the elastic spacer 26 is compressed from above and below by the low voltage electrode 7 and the dielectric unit 30, and the dielectric unit 30 is resiliently pressed from above and below by an equal pressure by this compression and maintained in a central portion, in the vertical direction, of the above mentioned space. Consequently, the discharge gaps 6 of an equal gap amount are formed at both sides of the dielectric unit 30.

Moreover, in a case where rigid spacers are used instead of the elastic spacers 26, when the blocks 25 are fastened, of course, the rigid spacers used are of a smaller diameter than the elected discharge gap length (the height of the discharge gap in the laminating direction). Thus, the spacers are not compressed in the laminating direction in the discharge gaps.

Next, operation will be explained.

When an alternating high voltage is applied between the low voltage electrode 7 and the high voltage electrode 3, a dielectric barrier discharge is generated in the discharge gap 6 via a dielectric 5. Oxygen gas is dissociated to single oxygen atoms by this discharge, and, at roughly the same time, a three body collision is induced between these oxygen atoms, other oxygen molecules and a wall and the like and ozone gas is generated. By using this mechanism and continuously supplying oxygen gas to the discharge gaps 6, the ozone gas generated by the discharge may be continuously derived as ozonized gas from the ozone gas outlet 11.

An ozone generating efficiency derived from this discharge is normally, at most, 20%. That is to say, 80% of the discharge power heats the electrodes and is lost. Also, the generating efficiency of the ozone gas is dependent on the temperature of the electrode (strictly speaking, the temperature of the discharge gas), and the lower the temperature of the electrode the higher the generating efficiency. Hence, the electrodes are directly cooled with cooling water and the like or a rise in gas temperature in the discharge gaps 6 may be suppressed by shortening the gap length of the discharge gap 6, and the ozone generating efficiency is increased by increasing the electron temperature, ozone decomposition is inhibited and, as a result, an efficient ozonizer capable of deriving highly concentrated ozone gas may be provided.

In a conventional ozonizer of such a construction, electrode cooling is one sided cooling of the low voltage electrode 7 side and the high voltage electrode 3 is not cooled. Thus, in a case where the same (amount of) power is supplied, the temperature of the gas in the discharge gaps 6 is about four (4) times that of a both side method for cooling the high and low voltage electrodes. Since the amount of generated ozone which is decomposed is increased by this rise in gas temperature, the discharge power density input to the electrode must be further increased and the ozone gas cannot be efficiently generated.

Moreover, when using the elastic spacers 26, because there are electrons having sufficiently high energy in the discharge gaps 6 due to the discharge, the elastic spacers 26 which are formed of an organic material collide with the high energy electrons (discharge energy) by contact with this discharge and the chemical bond incurs separation damage. When the ozonizer is used in continuous operation, the elastic spacers 26 deteriorate in a short period of time compared to metal spacers and an even flow of gas is made impossible by this deterioration, and there are drawbacks in that efficiency is rapidly reduced and the service life of the apparatus is shortened.

Also, even in a case where elastic spacers made of an ozone resistant Teflon (registered trademark) are used, the above mentioned high energy electrons (discharge energy) collide and the chemical bond suffers separation damage. Further, even if a material which is generally "flame retardant material" in air is used, as in the case of highly concentrated ozone or oxygen gas atmosphere "combustible material", there is a problem in that a sublimation reaction of the elastic spacers is activated by the discharge energy at a portion disposed to directly contact the discharge gap and clean ozone cannot be obtained.

On the other hand, in the case where the rigid spacers are used instead of the elastic spacers 26, they are, naturally, designed to be of a smaller diameter than the elected discharge gap length when being fastened via the blocks 25. Hence, when the discharge gaps 6 are tiny gaps and a high concentration of ozone is to be generated, a pressure loss of the gap partitioned by the spacers 26 for forming the discharge gaps (pressure loss of the tiny gaps between the dielectric 5 and the spacers 26 for forming the discharge gaps) is much smaller than the pressure loss of the discharge gas passages (pressure loss of the gas passages orthogonal to the page surface of FIG. 27). Thus, the even flow of gas is made difficult by the spacers 26 for forming the discharge gaps. Consequently, there are problems in that the ozone generating efficiency is degraded and the ozonizer cannot be made compact.

Generally, a fluid cannot be evenly flowed unless the pressure loss of the gap formed by the spacer 26 can be made approximately ten (10) times or more the pressure loss of the discharge passage portion. For example, when the discharge gap 6 is 0.1 mm, a gap between the thickness of the spacer 26 and the discharge gap must be highly precise. It is extremely difficult to manufacture the spacers 26 with this sort of precision and dispose them without contacting the discharge gap. For this reason, a large cost increase is incurred in order to manufacture the spacers 26 with good precision and inexpensive manufacture of the apparatus is impossible.

Moreover, in the conventional ozonizer constructed such as above, the electrode module including the pair of upper and lower low voltage electrodes 7, the bilateral blocks 25 sandwiched between these low voltage electrodes 7, 7, the dielectric units 30 positioned at the inner side of the blocks 25, 25 and disposed between the low voltage electrodes 7, 7, and the plurality of elastic spacers 26 for forming the discharge gap(s) provided at both sides of the dielectric unit 30 for forming the discharge gaps 6 is laminated as a plurality via the low voltage electrodes 7 and is secured between the electrode presser plate 22 provided on top and the base 24 provided at the bottom by the plurality of fastening bolts 21 as a fixing means passing through the electrode module at both side portions thereof in the laminating direction. That is, since the structure is such that the dielectric module held between the low voltage electrodes 7 is fastened at both ends thereof, both sides of the electrode module become fulcrums and the low voltage electrodes 7 which are supposed to be straight are deformed to a circular arc shape, and there is a problem in that, particularly in a discharge gap of 0.1 mm in thickness, the gap length cannot be even and highly concentrated ozone cannot be obtained.

Further, a conventional ozone passage 8 is manufactured without being gas sealed. Thus, 100% of the oxygen gas raw material cannot be supplied to each electrode module sandwiched by the laminated low voltage electrodes 7. That is, a "short pass phenomena" occurs in which oxygen gas escapes directly to the ozone gas outlet without passing through the discharge passage of the electrode module. When this "short pass phenomena" takes place, the ozone generating efficiency of the electrode module is reduced and highly concentrated ozone cannot be generated; further, since the concentration of the ozone generated by the discharge gap 6 is diluted by a short pass fluid flow of the raw material oxygen gas, there is a problem in that highly concentrated ozone gas cannot be further derived.

SUMMARY OF THE INVENTION

The present invention was made to overcome all of the above mentioned problems.

A first object of the present invention is to provide an ozonizer in which an electrode module construction has high reliability without damaging ozone generating characteristics and, nevertheless, the life of the electrode module may be increased.

A second object of the present invention is to provide an ozonizer in which lamination of an extremely thin sheet-shaped electrode module may be performed by means of a simple operation and further compact modularization may be realized.

A third object of the present invention is to provide an ozonizer in which a construction of both a high voltage electrode 3 and a low voltage electrode 7 is capable of being cooled well.

A fourth object of the present invention is to provide an ozonizer in which a purity of generated ozone gas is high, that is, clean ozone gas may be generated.

According to one aspect of the present invention there is provided an ozonizer including a flat plate-shaped low voltage electrode, a flat plate-shaped high voltage electrode facing a main surface of the low voltage electrode, a flat plate-shaped dielectric and a spacer for forming a discharge gap of a thin thickness in a laminating direction provided between the low voltage electrode and the high voltage electrode. The ozonizer also includes an electrode cooling sheet provided facing a main surface of the high voltage electrode at a side opposite the discharge gap for cooling the high voltage electrode, a thermal conducting/electric insulating sheet sandwiched between the high voltage electrode and the electrode cooling sheet. An alternating voltage is applied between the low voltage electrode and the high voltage electrode and a discharge is produced in the discharge gap injected with oxygen gas to produce ozone gas.

Thus, the cooling efficiency of the discharge gaps is improved and the temperature of the discharge gaps may be satisfactorily reduced. Accordingly, power density may be increased without decreasing ozone generating efficiency, and size reduction and cost reduction may be provided for an apparatus in which it is possible to reduce the number of electrode modules. Further, since the high voltage electrodes are cooled via the thermal conducting/electric insulating sheets, standard service water may be used as cooling water without using ion exchanged water and the like of small electric conductivity.

According to another aspect of the present invention there is provided an ozonizer including a flat plate-shaped low voltage electrode, a flat plate-shaped high voltage electrode is provided facing a main surface of the low voltage electrode. The ozonizer also includes a flat plate-shaped dielectric and a spacer for forming a discharge gap of a thin thickness in a laminating direction provided between the low voltage electrode and the high voltage electrode, an electrode cooling sheet provided facing a main surface of the high voltage electrode at a side opposite the discharge gap for cooling the high voltage electrode. The ozonizer also includes a flexible thermal conducting/electric insulating sheet sandwiched between the high voltage electrode and the electrode cooling sheet. An alternating voltage is applied between the low voltage electrode and the high voltage electrode and a discharge is produced in the discharge gap injected with oxygen gas to produce ozone gas.

Thus, an electric conductivity monitoring device or ion exchanged water circulating equipment and the like is unnecessary and, by reducing the number of apparatus components, it is possible provide for cost reductions or reduce maintenance costs.

According to still another aspect of the present invention there is provided an ozonizer including a flat plate-shaped low voltage electrode, a flat plate-shaped high voltage electrode provided facing both main surfaces of the low voltage electrode. The ozonizer also includes a flat plate-shaped dielectric and a spacer for forming a discharge gap of a thin thickness in a laminating direction provided between the low voltage electrode and the high voltage electrode, an electrode cooling sheet provided facing a main surface of the high voltage electrode at a side opposite the discharge gap for cooling the high voltage electrode. The ozonizer also includes a thermal conducting/electric insulating sheet sandwiched between the high voltage electrode and the electrode cooling sheet. The ozonizer also includes a manifold block provided between the low voltage electrode and the electrode cooling sheet, and formed with a cooling water passage connected with cooling water passages provided in the low voltage electrode and the electrode cooling sheet, or formed with an ozone gas passage connected with the ozone gas passage provided in the low voltage electrode, both main surfaces of the low voltage electrode facing the discharge gap are covered in an inorganic dielectric film. The ozonizer also includes a main surface of the dielectric facing the high voltage electrode coated with a conductive film having conductive properties, and the conductive film contacts the high voltage electrode, a flexible thermal conducting sheet is sandwiched between the high voltage electrode and the thermal conducting/electric insulating sheet and the thermal conducting/electric insulating sheet and the electrode cooling sheet, contacting each respectively. An alternating voltage is applied between the low voltage electrode and the high voltage electrode and a discharge is produced in the discharge gap injected with oxygen gas to produce ozone gas.

Thus, it is possible to form discharge gaps for generating clean ozone in which metallic contamination does not develop and the cooling efficiency of the discharge gaps 6 may be improved.

DETAILED DESCRIPTION OF THE PREFERRED EMBODIMENTS

The present invention will be explained below with reference to the drawings.

Figure 1:
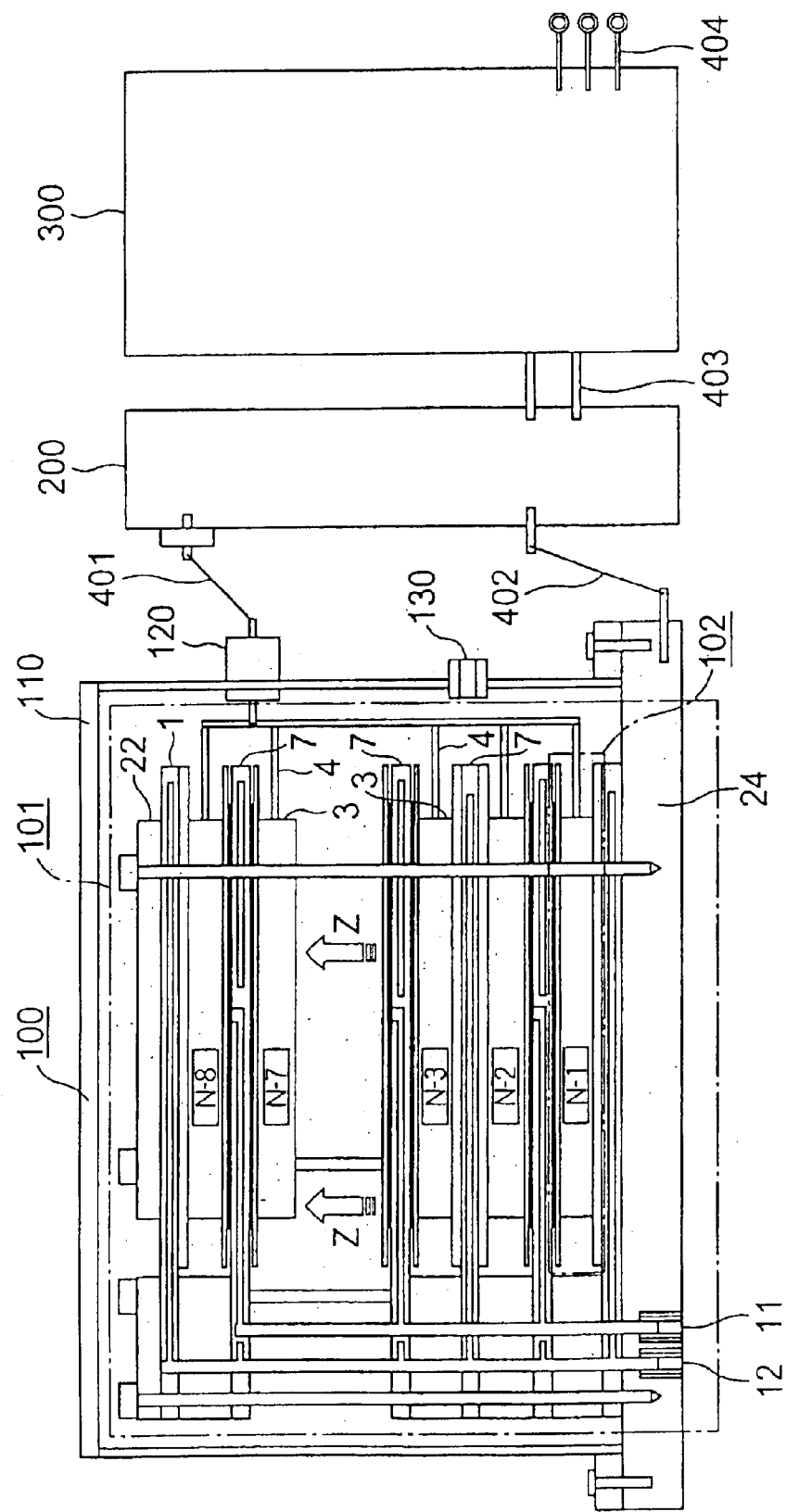
FIG. 1 is a typical explanatory drawing for explaining the ozonizer of the present invention.

FIG. 1 is a typical explanatory drawing for explaining a flat plate laminated ozone generating apparatus. The flat plate laminated ozone generating apparatus comprises an ozonizer 100 as an essential construction for generating ozone, an ozone transformer 200 for supplying power to the ozonizer 100 and a high frequency inverter 300.

The high frequency inverter 300 changes to a required frequency power input from a power source input 404 and outputs it to an inverter output cable 403. The ozone transformer 200 increases this power to a predetermined voltage and supplies it as power necessary for generating ozone to the ozonizer 100. The high frequency inverter 300 further has the function of regulating current/voltage and controls a supplied power injection rate.

High voltage supplied from the ozone transformer 200 is supplied to high voltage electrodes 3 of the ozonizer from a high voltage cable 401 through a high voltage bushing 120. On the other hand, low voltage is supplied to a low voltage electrode 7 from a low voltage cable 402 via a base 24.

The ozonizer 100 includes a plurality of electrode modules 102 comprising high voltage, electrodes 3 and a low voltage electrode 7. A predetermined number of electrode modules 102 are laminated on the base 24 in a direction of an arrow Z in the drawing to construct an ozonizer electrode 101. The ozonizer electrode 101 is covered by a generator cover 110. An ozonizer oxygen gas inlet 130 for supplying oxygen gas including trace amounts of nitrogen and carbon dioxide is provided at the generator cover 110. The supplied oxygen gas impregnates the generator cover 110 and is entrapped in later-described discharge gaps. Meanwhile, an ozone gas outlet 11 for expelling ozone gas formed by the after-described discharge gaps to outside from the ozonizer 100 and a cooling water inlet/outlet 12 for bringing in and putting out cooling water for cooling the electrode modules 102 are provided in the base 24.

In the flat plate laminated ozone generating apparatus constructed such as above, the present invention particularly relates to the ozonizer 100 which is an essential portion of the ozone generating apparatus, and specifically, to a construction of a an ozonizer electrode 101 and an electrode module 102 of the ozonizer 100.

Embodiment 1

Figure 2:
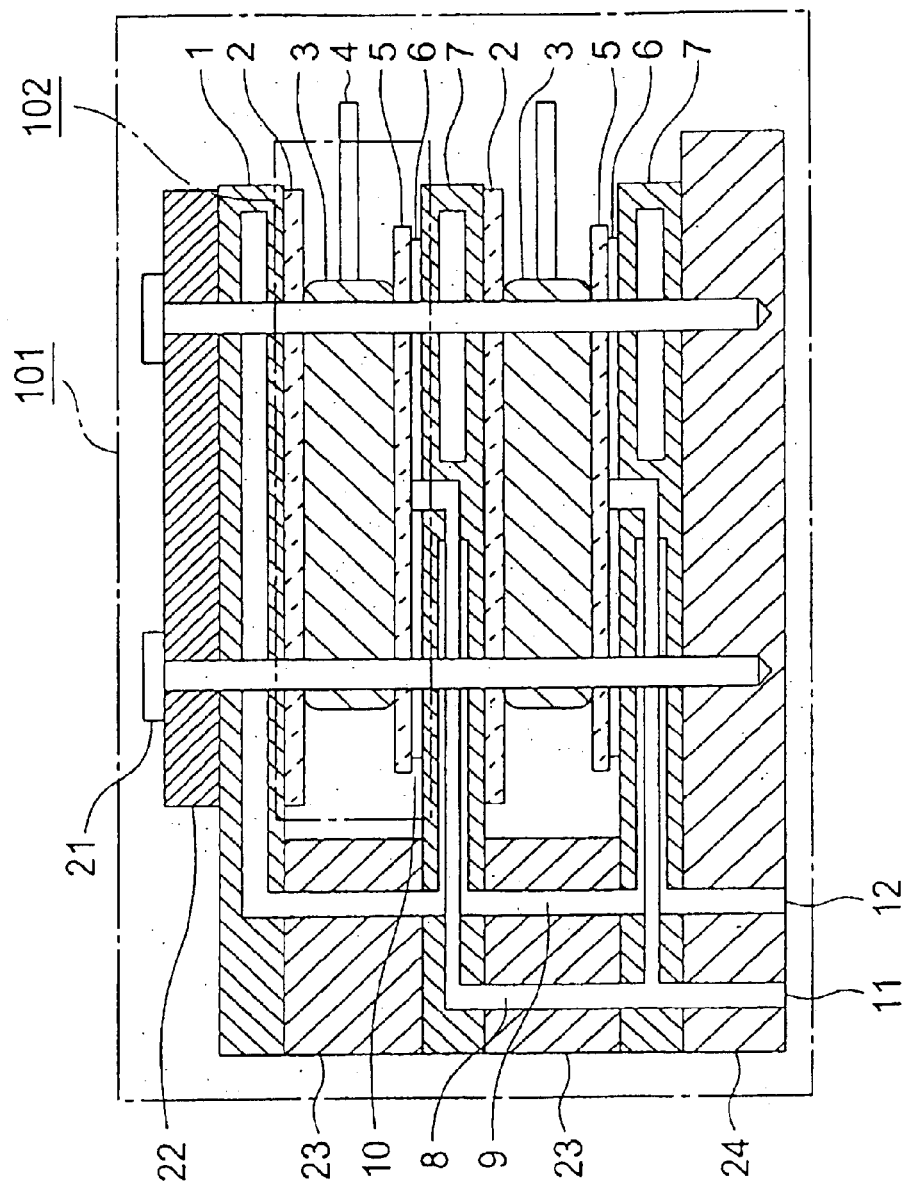
FIG. 2 is a typical detailed cross sectional drawing of an ozonizer electrode of an ozonizer of an Embodiment 1 of the present invention.

FIG. 2 is a typical detailed cross sectional drawing of an ozonizer electrode of an ozonizer of Embodiment 1 of the present invention. In FIG. 2, an ozonizer electrode 101 comprises a flat plate-shaped low voltage electrode 7, a flat plate-shaped high voltage electrode 3 facing a main surface of the low voltage electrode 7, a flat plate-shaped dielectric 5 and a spacer (not shown) for forming a discharge gap 6 of a thin thickness in a laminating direction provided between the low voltage electrode 7 and the high voltage electrode 3.

The ozonizer electrode 101 further comprises an electrode cooling sheet 1 provided facing a main surface of the high voltage electrode 3 at a side opposite the discharge gap 6 for cooling the high voltage electrode 3, and a thermal conducting/electric insulating sheet 2 sandwiched between the high voltage electrode 3 and the electrode cooling sheet 1.

In the ozonizer electrode 101, an alternating voltage is applied between the low voltage electrode 7 and the high voltage electrode 3 and a discharge is produced in the discharge gap 6 injected with oxygen gas to produce ozone gas.

Power is supplied to a feed terminal 4 of the high voltage electrode 3 from an ozone transformer 200 (shown in FIG. 2) via a high voltage bushing 120. The high voltage electrode 3 is made of a metal such as stainless steel, aluminum and the like. A main surface of the dielectric 5 is adhered to the high voltage electrode 3. The dielectric 5 is made of a material such as ceramic, glass, silicon and the like. A discharge gap 6 is formed between the dielectric 5 and low voltage electrode 7 by means of a later-described spacer. In the present embodiment, the discharge gap 6 is formed in a disk shape and oxygen gas impregnated in the generator cover 110 of FIG. 1 is injected from an entire periphery of the discharge gap 6 toward a central direction.

Oxygen gas flowing in the discharge gap 6 is converted to ozone by applying an alternating voltage between the low voltage electrode 7 and the high voltage electrode 3. The ozone gas converted to ozonified oxygen by the discharge gap 6 is led to the ozone gas outlet 11 from a central portion of the low voltage electrode 7 via an ozone gas passage 8 provided in the low voltage electrode 7.

The low voltage electrode 7 is a thin sheet-shaped conductive rigid body comprising two (2) conductive plates, such as stainless steel plates and the like, joined so as to form the ozone gas passage 8 there-between. A cooling water passage 9 for increasing an ozone generating efficiency is provided in the low voltage electrode 7 in addition to the ozone gas passage(s) 8. A gas temperature in the discharge gap 6 is lowered by flowing cooling water in the cooling water passage 9.

The high voltage electrode 3 is disposed at a main surface of the low voltage electrode 7 at a side opposite the discharge gap 6 via the thermal conducting/electric insulating sheet 2. Thus, the low voltage electrode 7 cools the high voltage electrode 3 in addition to the discharge gap 6. Also, a water cooling type electrode cooling sheet 1 is disposed at an uppermost high voltage electrode 3 via the thermal conducting/electric insulating sheet 2. The electrode cooling sheet 1 is a thin sheet-shaped rigid body comprising two (2) steel plates, such as stainless steel plates and the like, joined so as to form a cooling water passage 9 there-between. That is, the cooling water passage 9 is also formed in the electrode cooling sheet 1 and cooling water flows in this cooling water passage 9.

The ozone gas passage 8 formed in the low voltage electrode 7 is connected to the ozone gas outlet 11 provided in the base 24 via an ozone gas passage 8 formed in a manifold block 23. On the other hand, the cooling water passages 9 formed in the electrode cooling sheet 1 and low voltage electrode 7 are connected to the cooling water inlet/outlet 12 provided in the base 24 via a cooling water passage 9 formed in the manifold block 23.

Although not specifically shown in the drawings, a gasket material, such as an O-ring and the like, is sandwiched between the electrode cooling sheet 1 or low voltage electrode 7 and manifold block 23 or base 24 for water-tightness of the cooling water. Moreover, a gasket material, such as an O-ring and the like, is also sandwiched for air-tightness of the ozone gas.

An electrode module(s) 102 comprising the low voltage electrode 7, high voltage electrode 3, dielectric 5, spacer, electrode cooling sheet 1 and thermal conducting/electric insulating sheet 2 is fastened and fixed between an electrode presser plate 22 and the base 24 by fastening bolts 21 passing through each structural element. The discharge gaps 6 are maintained at a predetermined thickness in the laminating direction by means of the manifold block 23.

Moreover, in the present embodiment, the dielectric 5, necessary for silent (dielectric barrier) discharge, is provided between the low voltage electrode 7 and high voltage electrode 3 and the spacer is disposed between this dielectric 5 and the low voltage electrode 7 to provide the discharge gap 6. However, the spacer may also be disposed between the high voltage electrode 3 and the dielectric 5 to provide the discharge gap 6.

Next, operation will be explained, when an alternating voltage is applied between the low voltage electrode 7 and the high voltage electrode 3 a silent (dielectric barrier) discharge is produced by the discharge gap 6. When oxygen gas is passed in the discharge gap 6, the oxygen is converted and ozone is produced. The oxygen gas impregnating the generator cover 110 passes through the discharge gap 6 formed between the low voltage electrode 7 and dielectric 5 and in this course is converted to ozone. In the present embodiment, the high voltage electrode 3, dielectric 5 and discharge gap 6 formed there-between are each formed in a an approximate disk shape. The oxygen gas flows from an entire periphery of the dielectric 5 toward a center and becomes ozonified oxygen gas in the discharge gaps 6.

In order to efficiently create ozone it is necessary that the discharge gap 6, which is a space of particularly thin thickness, be precisely maintained. The electrode module laminated body is fastened between the electrode presser plate 22 and the base 24 by means of the plurality of fastening bolts 21 disposed in the blocks 23 and passing through both side portions thereof in the laminating direction so as to obtain a predetermined gap precision. The discharge gap(s) 6 is formed by means of discharge gap spacers (not shown) disposed at a surface of the low voltage electrode 7. That is to say, a thickness of the discharge gap 6 (height in the laminating direction) is set by a height of these discharge gap spacers. The precision of the discharge gaps 6 is maintained by uniformly processing the height of the discharge gap spacers and by fastening each electrode with the fastening bolts 21.

As an additional means for efficiently creating ozone, a method for lowering a temperature inside the discharge gaps 6 may be given. A method is conceived wherein the high voltage electrode 3 and low voltage electrode 7 are provided as electrodes and both these electrodes are cooled with water or gas and the like. Although, between water and gas, a cooling effect is greater with water, in a case where water is used it is necessary to decrease an electric conductivity (use ion exchanged water etc.) of the cooling water because a high voltage is applied at the high voltage electrode 3. On the other hand, although there is an advantage in that this is not necessary in a case where gas is used, there are disadvantages in that the construction becomes complicated and there is a lot of noise or a heat capacity of the coolant is small.

In the present embodiment, the discharge gaps 6 are formed adjacent to the low voltage electrode 7 and the discharge gaps 6 are cooled by providing cooling water passages 9 in the low voltage electrode 7. Moreover, the electrode cooling sheets 1 are provided, via the thermal conducting/electric insulating sheets 2, for cooling the high voltage electrodes 3, and thus a structure is such that heat of the high voltage electrodes 3 is vented. Heat generated by the high voltage electrodes 3 passes through the thermal conducting/electric insulating sheets 2 having high thermal conductivity and excellent electric insulating characteristics and is cooled by means of the low voltage electrode 7 heat sinked by the cooling water. Moreover the uppermost (high voltage electrode 3) is cooled by means of the electrode cooling sheet 1. Hence, it is possible to keep the gas temperature of the discharge gaps 6 low by simultaneously cooling the high voltage electrodes 3 and low voltage electrode 7.

Furthermore, since a construction is such that the high voltage electrode 3 may be cooled by the low voltage electrode 7 via the thermal conducting/electric insulating sheet 2 and the, uppermost (high voltage electrode 3) may be cooled by the electrode cooling sheet 1, it is not necessary to lower the electric conductivity of the cooling water flowing in the low voltage electrode 7 and electrode cooling sheet 1 and standard service water may be used. Thus, there is also an advantage in that the cooling water may be common with that for cooling the low voltage electrode 7.

Accordingly, in the present embodiment, the cooling efficiency of the discharge gaps 6 is improved and the temperature of the discharge gaps 6 may be satisfactorily reduced. Thus, power density may be increased without decreasing ozone generating efficiency, and size reduction and cost reduction may be provided for in an apparatus in which it is possible to reduce the number of electrode modules. Further, since the high voltage electrodes 3 are cooled via the thermal conducting/electric insulating sheets 2, standard service water may be used as cooling water without using ion exchanged water and the like of a small electric conductivity. Thus, an electric conductivity monitoring device or ion exchanged water circulating equipment and the like is unnecessary and, by reducing the number of apparatus components, it is possible to provide for cost reductions or reduce maintenance costs.

Embodiment 2

Figure 3:
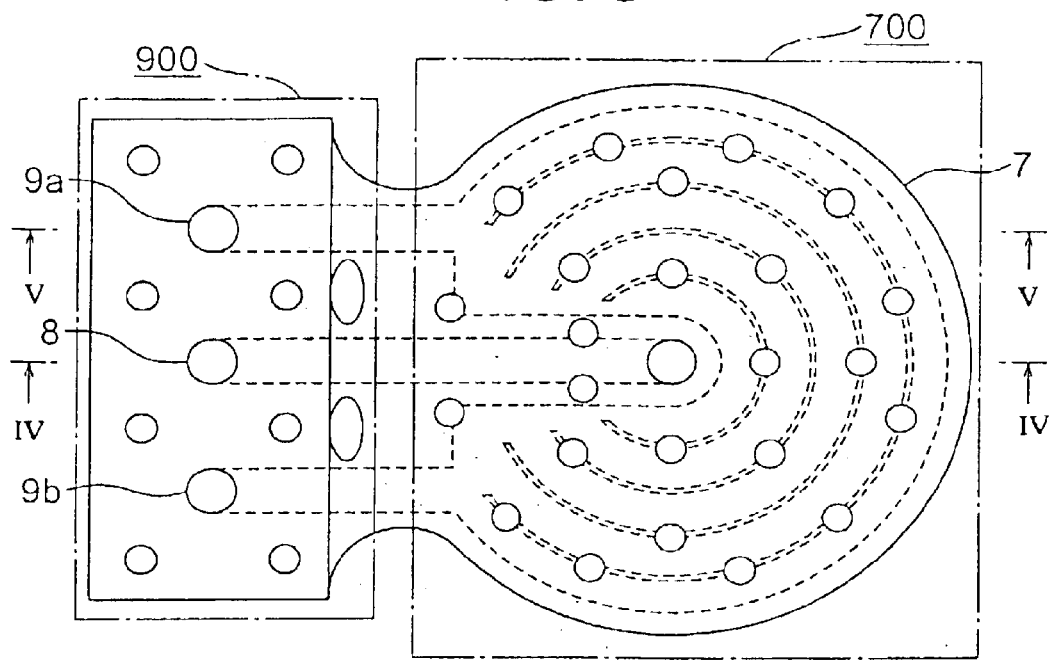
FIG. 3 is a top view of a low voltage electrode of an ozonizer of an Embodiment 2 of the present invention.
Figure 4:
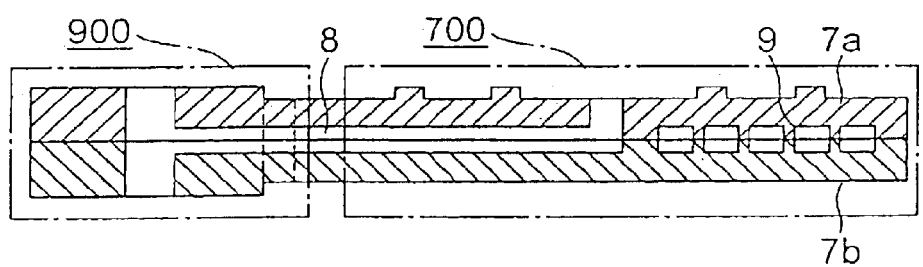
FIG. 4 is cross sectional perspective view taken along the line A—A in FIG. 3.
Figure 5:
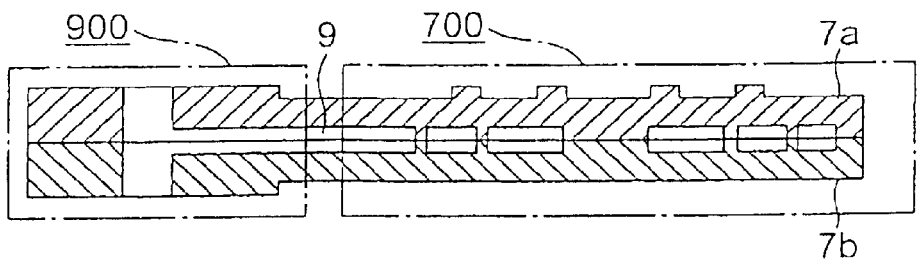
FIG. 5 is cross sectional perspective view taken along the line B—B in FIG. 3.

FIG. 3 is a top view of a low voltage electrode 7 of an ozonizer of Embodiment 2 of the present invention. FIG. 4 is cross sectional perspective view taken along the line A—A in FIG. 3. FIG. 5 is cross sectional perspective view taken along the line B—B in FIG. 3. As shown in FIGS. 4 and 5, the low voltage electrode 7 is constructed from two (2) metal electrodes, an upper low voltage electrode 7a and a lower low voltage electrode 7b. Grooves of several mm in depth are formed by etching or machining in advance a main surface of the two electrodes 7a, 7b. Then, the two electrodes 7a, 7b are adhered such that these grooves line up to produce the low voltage electrode 7. The lined up grooves form an ozone gas passage 8 and cooling water passage(s) 9 inside the low voltage electrode 7.

Furthermore, an ozone gas passage 8 and cooling water passage 9 extending in the laminating direction are formed in an ozone gas/cooling water deriving portion 900 at one end portion (left side in FIG. 3) of the low voltage electrode 7. Here, the cooling water passage 9 is divided into a cooling water inlet 9a and a cooling water outlet 9b. The cooling water passage(s) 9 connected to the cooling water inlet 9a and cooling water outlet 9b is formed over an approximate entirety inside the low voltage electrode 7, as shown by the dotted line in FIG. 3. That is, they are formed as a plurality of concentric disk shapes from a center to a peripheral portion in an approximately disk-shaped low voltage electrode discharge portion 700. Moreover, adjacent concentric disk-shaped cooling water passages 9 are partitioned by ribs of a thin width. On the other hand, the ozone gas passage 8 formed inside the low voltage electrode 7 extends from the passage extending in the laminating direction at the end portion to the central portion and is connected to an opening formed in one side main surfaces at the central portion.

The ozone gas passage 8 extending in the laminating direction and provided at the end portion of the low voltage electrode 7 and the cooling water passages 9 are connected with the ozone gas passage and cooling water passage formed in the manifold block 23 and finally connected to the ozone gas outlet 11 and cooling water outlet/inlet 12 provided in the base 24.

A plurality of round convex portions for forming the discharge gaps 6 are formed by similar etching or machining over entire main surfaces which are at opposite sides of the surfaces where grooves are formed for forming the ozone gas passage 8 and cooling water passages 9 of the upper side electrode 7a. The above ozone gas passage 8 is communicated with the opening formed in the surface for forming the discharge gaps 6.

Generated ozone gas is led from the central portion of the low voltage electrode 7 through the ozone gas passage 8 provided in the low voltage electrode 7 to the ozone gas passage 8 extending in the laminating direction in the ozone gas/cooling water deriving portion 900 of one end portion of the low voltage electrode 7. On the other hand, cooling water flowing throughout the whole interior of the low voltage electrode 7 enters the low voltage electrode 7 from a cooling water inlet opening 9a of the ozone gas/cooling water deriving portion 900 and cools the entire surface(s) of the low voltage electrode discharge portion 700 and comes out the cooling water outlet opening 9b of the ozone gas/cooling water deriving portion 900.

The collection of ozone gas outlets and collective structure of inlets/outlets of cooling water in the ozone gas/cooling water deriving portion 900 at the end portion of the low voltage electrode 7 is connected to the ozone gas outlet 11 and cooling water inlet/outlet 12, respectfully, provided in the base 24 in cooperation with the manifold blocks 23 provided adjacent to the low voltage electrode 7. Thus, in the present embodiment, collective coupling and piping members are eliminated by forming passages in the low voltage electrode 7 and manifold block 23 and a compact and simplified ozonizer is realized by reducing the space for these coupling and piping members.

Accordingly, in the present embodiment, an airtight circulating space is constructed by adhering together at least two (2) metal plates with convexoconcave processing within several mm by etching or machining the low voltage electrode 7, and because the ozone gas passage 8 and the cooling water passages 9 are formed so as to be separated in an airtight manner, it is possible to decrease the thickness of the low voltage electrode 7 and reduce the size of the apparatus. Furthermore, since piping for deriving cooling water and ozone is unnecessary, assembly and disassembly may be simply performed and a low cost ozonizer may be provided.

Moreover, in the present embodiment, although the low voltage electrode 7 is made by joining together two (2) electrodes 7a, 7b, three (3) or more electrodes may also be joined to form an ozone gas passage 8 and cooling water passages 9 at an inside portion thereof.

Also, in the present embodiment, although the discharge gap 6 is provided between the low voltage electrode 7 and dielectric 5 and the ozone gas passage 8 is formed inside the low voltage electrode 7, a discharge gap may be provided between the high voltage electrode 3 and dielectric 5 and an ozone gas passage may be formed inside the high voltage electrode 3.

Embodiment 3

Figure 6:
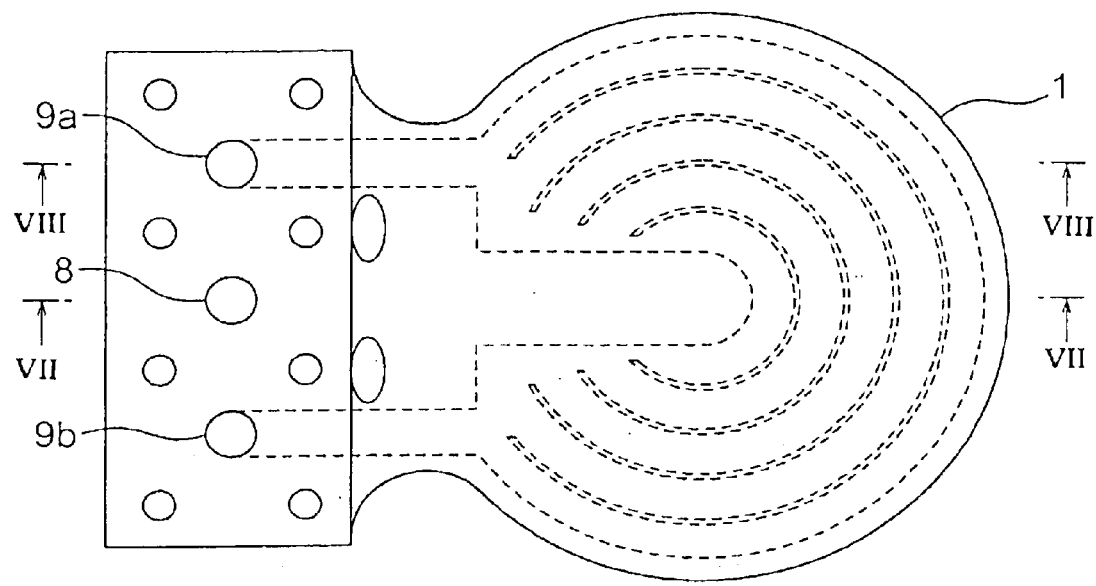
FIG. 6 is a top view of an electrode cooling sheet of an ozonizer of an Embodiment 3 of the present invention.
Figure 7:
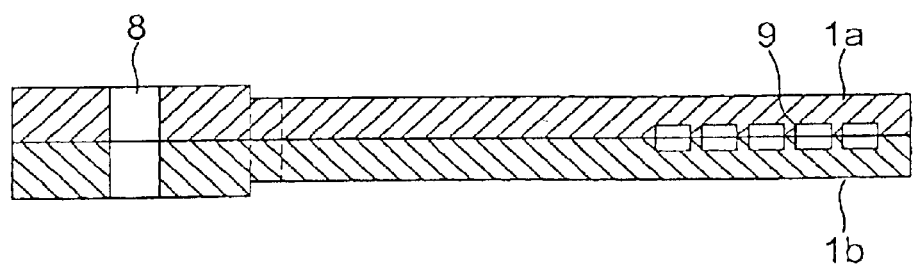
FIG. 7 is cross sectional perspective view taken along the line C—C in FIG. 6.
Figure 8:
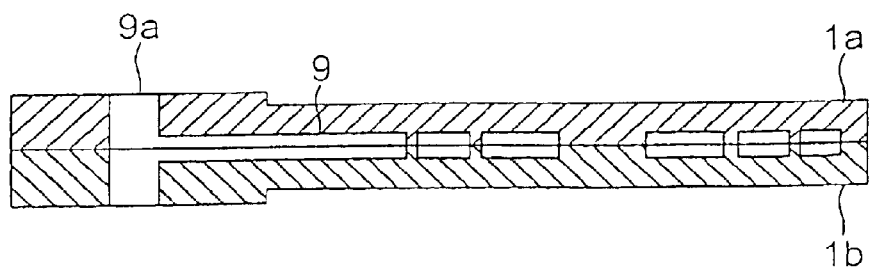
FIG. 8 is cross sectional perspective view taken along the line D—D in FIG. 6.

FIG. 6 is a top view of an electrode cooling sheet 1 of an ozonizer of an Embodiment 3 of the present invention. FIG. 7 is cross sectional perspective view taken along the line C—C in FIG. 6. FIG. 8 is cross sectional perspective view taken along the line D—D in FIG. 6. As shown in FIGS. 7 and 8, the electrode cooling sheet 1 is constructed from two (2) metal sheets, an upper electrode cooling sheet 1a and a lower electrode cooling sheet 1b. Grooves of several mm in depth are formed by etching or machining in advance a main surface of the two metal sheets 1a, 1b. Then, the two metal sheets 1a, 1b are adhered such that these grooves line up to produce the electrode cooling sheet 1. The lined up grooves form cooling water passages 9 inside the electrode cooling sheet 1.

An ozone gas passage 8 and cooling water passage 9 extending in the laminating direction are formed at an end portion (left side in FIG. 3) of the electrode cooling sheet 1, as in the ozone gas/cooling water deriving portion 900 of the low voltage electrode 7 of Embodiment 2. Here, the cooling water passage 9 is divided into a cooling water inlet 9a and a cooling water outlet 9b. The cooling water passage(s) 9 connected to the cooling water inlet 9a and cooling water outlet 9b is formed over an approximate entirety inside the electrode cooling sheet 1, as shown by the dotted line in FIG. 6. That is, they are formed as a plurality of concentric disk shapes from a center to a peripheral portion in an approximately disk-shaped main portion. Moreover, adjacent concentric disk-shaped cooling water passages 9 are partitioned by ribs of a thin width.

The ozone gas passage 8 extending in the laminating direction and provided at the end portion of the electrode cooling sheet 1 and the cooling water passages 9 are connected with an ozone gas passage and cooling water passage formed in the manifold block(s) 23 and finally connected to the ozone gas outlet 11 and cooling water outlet/inlet 12 provided in the base 24.

Accordingly, in the present embodiment, since an airtight circulating space is constructed by adhering together at least two (2) metal sheets with convexoconcave processing within several mm by etching or machining the electrode cooling sheet 1 and the cooling water passages 9 are formed, it is possible to decrease the thickness of the electrode cooling sheet 1 and reduce the size of the apparatus. Furthermore, since piping for deriving cooling water and ozone is unnecessary, assembly and disassembly may be simply performed and a low cost ozonizer may be provided.

Moreover, in the present embodiment, although the electrode cooling sheet 1 is made by joining together two (2) metal sheets 1a, 1b, three (3) or more sheets may also be joined to form an ozone gas passage 8 and cooling water passages 9 at an inside portion thereof.

Embodiment 4

The present embodiment relates to a method of joining metal plates. As a common method for joining the two (2) metal sheets 1a, 1b, a brazing method using a brazing filler as a bonding agent may be given. Incidentally, because ozone circulates in the ozone gas passage 8, the ozone gas causes an oxidation reaction with the brazing filler and this produces adverse phenomena for the ozonizer such as ozone gas decomposition, the creation of oxides and the like. Here, in the present invention, this common brazing method is not employed.

That is to say, this common brazing method is not used in joining the two electrodes 7a, 7b of Embodiment 2 and the two metal plates 1a, 1b of Embodiment 3. In the present embodiment, a heating/pressure type joining method is used for joining the two metal plates. In this method, two metal plates are pressed together in the laminating direction with a large pressure while heating and the metal (plates) are fused at their contact surfaces to be joined together. The metal is melted at the particular melting point of the metal. Thus, it is possible to join the metal by means of a predetermined heat and predetermined pressure which are determined by the joining material. Another bonding agent is also not used at all, to say nothing of brazing filler. Thus, it is possible to generate clean ozone without producing an oxide reactant due to ozone.

Accordingly, in the present invention, since the joining method used for adhering two or more metal plates joins by means of heat and pressure only, without using a bonding agent, ozone caused corrosion of the bonding agent does not occur and it is possible to realize an ozonizer having a long life and high reliability.

Embodiment 5

Figure 9:
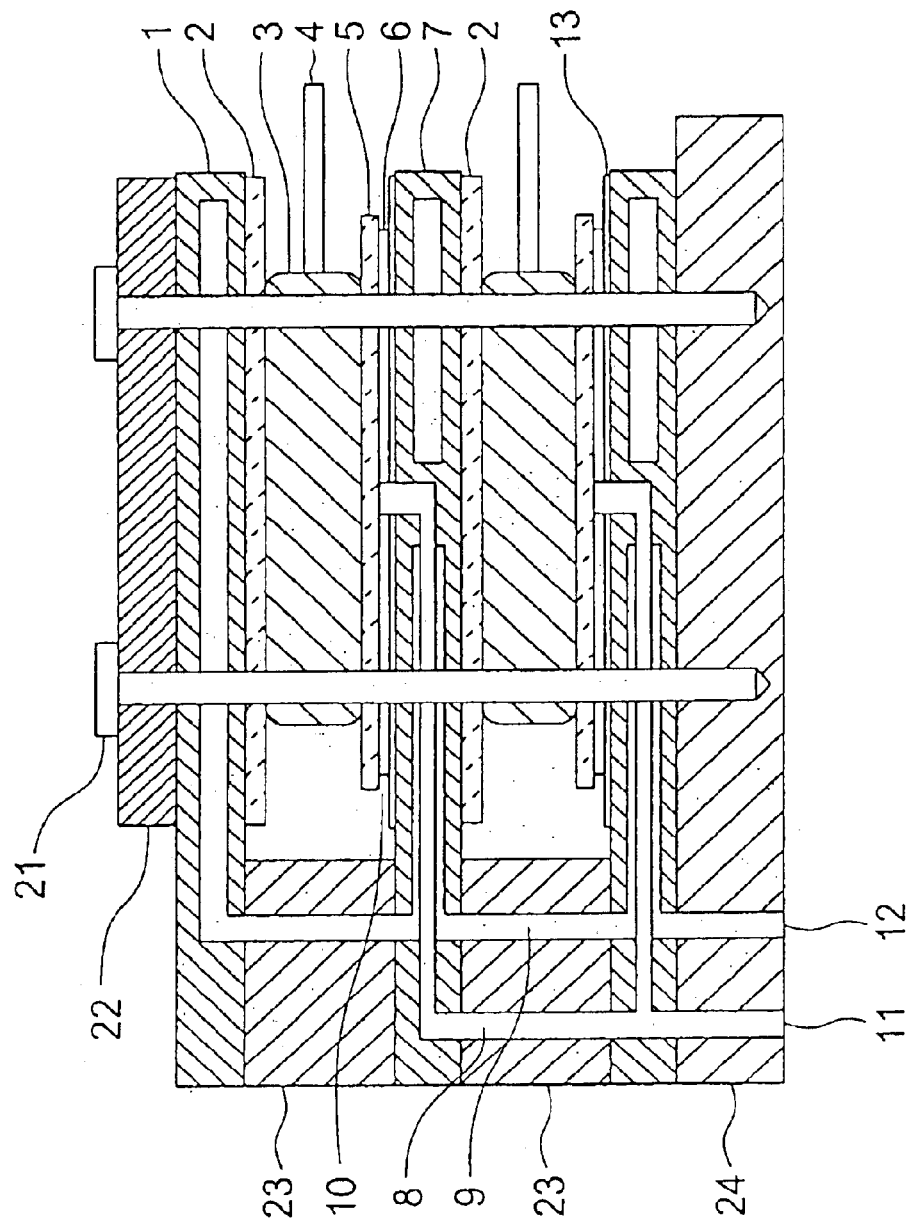
FIG. 9 is a detailed cross sectional drawing of an ozonizer electrode of an ozonizer of an Embodiment 5 of the present invention.

FIG. 9 is a detailed cross sectional drawing of an ozonizer electrode of an ozonizer of an Embodiment 5 of the present invention. In the present invention, an entire discharge surface of the low voltage electrode 7 facing the discharge gap 6 is covered with a dielectric film 13 of an inorganic material. This dielectric film 13 faces the discharge gap 6. A thickness of the dielectric film 13 is sufficient to block metal ions.

In an ozonizer constructed such as above, both surfaces of the discharge gap 6 for producing a silent discharge are enclosed with the inorganic material, and clean ozone without metallic contamination may be generated by passing oxygen gas through this gap.

Embodiment 6

Figure 10:
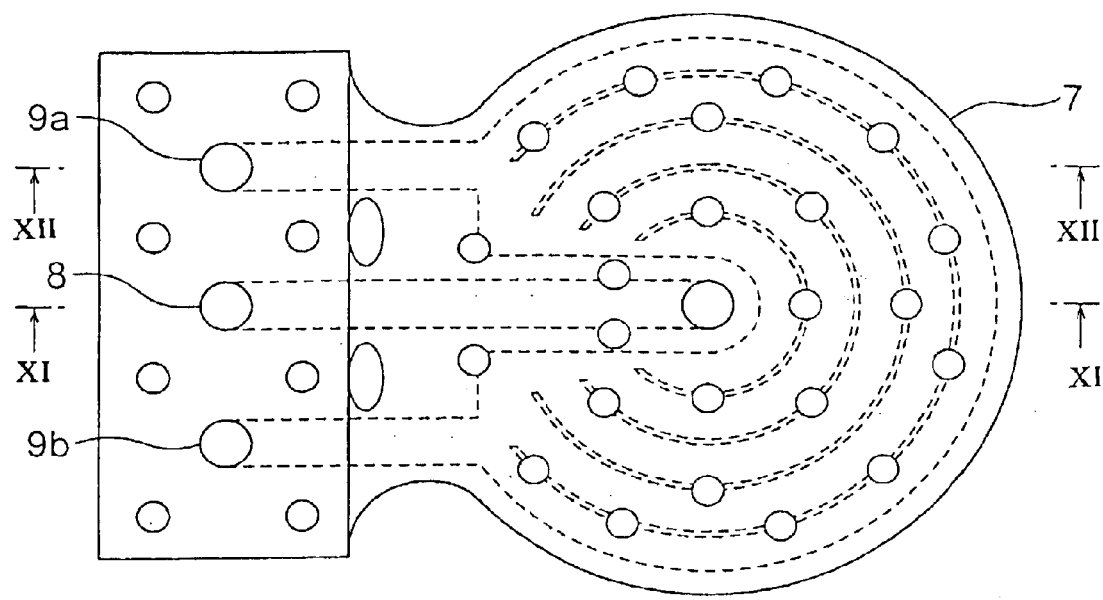
FIG. 10 is a top view of a low voltage electrode of an ozonizer of an Embodiment 6 of the present invention.
Figure 11:
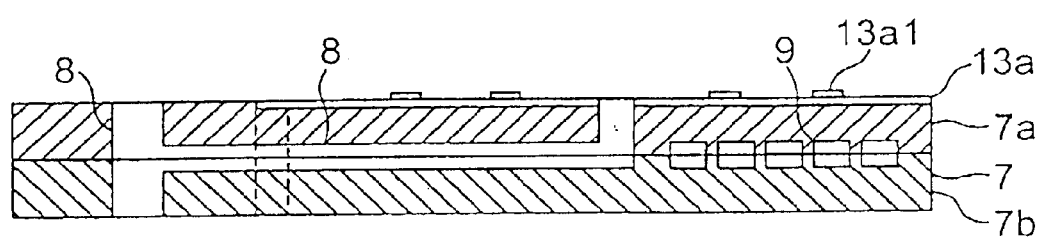
FIG. 11 is cross sectional perspective view taken along the line E—E in FIG. 10.
Figure 12:
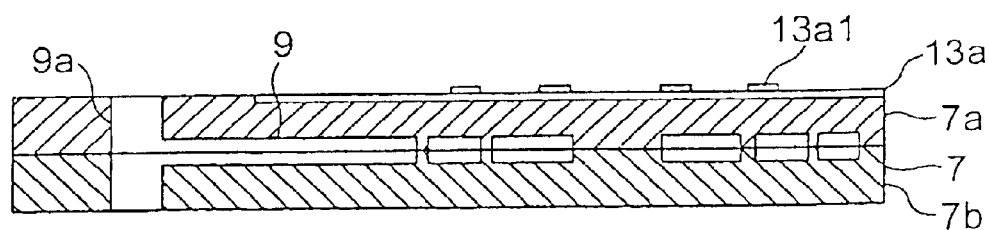
FIG. 12 is cross sectional perspective view taken along the line F—F in FIG. 10.

FIG. 10 is a top view of a low voltage electrode 7 of an ozonizer of an Embodiment 6 of the present invention. FIG. 11 is cross sectional perspective view taken along the line E—E in FIG. 10. FIG. 12 is cross sectional perspective view taken along the line F—F in FIG. 10. In the present embodiment, an entire discharge surface of the low voltage electrode 7 facing the discharge gap 6 is covered with a ceramic dielectric film 13a. The ceramic dielectric film 13a faces the discharge gap 6. A plurality of small, disk-shaped, ceramic dielectric discharge gap spacers 13a1 for forming the discharge gap 6 are disposed on the ceramic dielectric film 13a.

In an ozonizer constructed such as above, oxygen gas flows into the discharge gap 6 from an outer periphery of the low voltage electrode 7 and ozone is formed by means of a silent discharge while the oxygen gas passes between the ceramic dielectric discharge gap spacers 13a1, and the ozone passes through an inner portion of the low voltage electrode 7 and flows out to the outside by means of an ozone gas passage 8 formed in a central portion of the low voltage electrode 7. At this time, because the spacers are also an inorganic material, in addition to both surfaces enclosing the discharge gap 6 with the inorganic material, a further clean ozone without metallic contamination may be generated.

Moreover, the ceramic dielectric film 13a is formed by a thermal spraying technique and thickness thereof is controlled to several μm. Further, according to this thermal spraying technique, it is also possible form the ceramic dielectric discharge gap spacers 13a1 concurrently.

Embodiment 7

Figure 13:
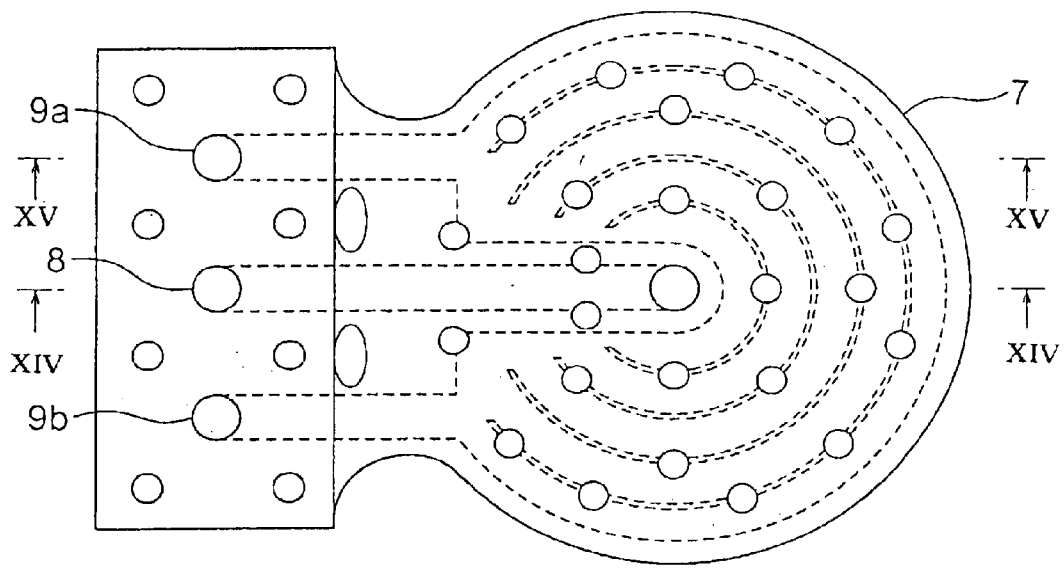
FIG. 13 is a top view of a low voltage electrode of an ozonizer of an Embodiment 7 of the present invention.
Figure 14:
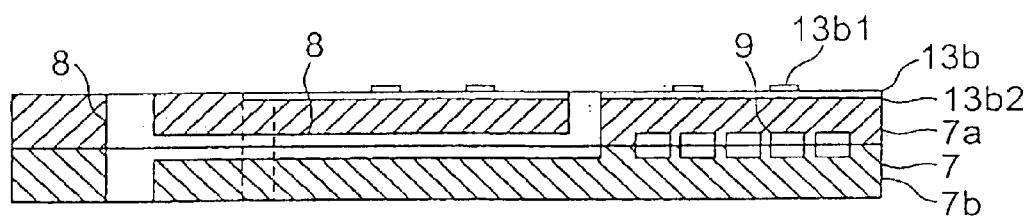
FIG. 14 is cross sectional perspective view taken along the line G—G in FIG. 13.
Figure 15:
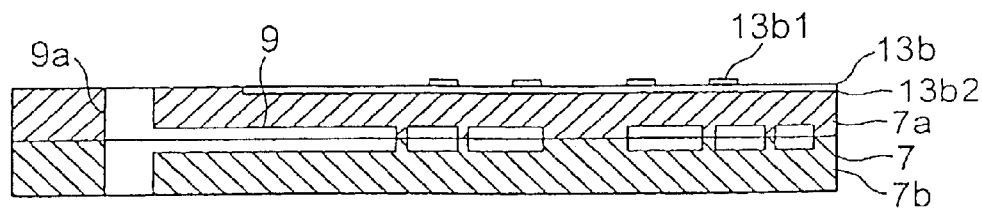
FIG. 15 is cross sectional perspective view taken along the line H—H in FIG. 13.

FIG. 13 is a top view of a low voltage electrode 7 of an ozonizer of an Embodiment 7 of the present invention. FIG. 14 is cross sectional perspective view taken along the line G—G in FIG. 13. FIG. 15 is cross sectional perspective view taken along the line H—H in FIG. 13. In the present embodiment, an entire discharge surface of the low voltage electrode 7 facing the discharge gap 6 is covered with a glass dielectric film 13b. The glass dielectric film 13b faces the discharge gap 6. A plurality of small, disk-shaped, glass dielectric discharge gap spacers 13b1 for forming the discharge gap 6 are disposed on the glass dielectric film 13b.

In an ozonizer constructed such as above, oxygen gas flows into the discharge gap 6 from an outer periphery of the low voltage electrode 7 and ozone is formed by means of a silent discharge while the oxygen gas passes between the glass dielectric discharge gap spacers 13b1, and the ozone passes through an inner portion of the low voltage electrode 7 and flows out to the outside by means of an ozone gas passage formed in a central portion of the low voltage electrode 7. At this time, because the spacers are also an inorganic material, in addition to both surfaces enclosing the discharge gap 6 with the inorganic material, a further clean ozone without metallic contamination may be generated.

Moreover, in making the glass dielectric film 13b, first, a glass plate of a quartz material is subjected to a shot blasting treatment-using a mask and the convex glass dielectric discharge gap spacers 13b1 are formed. Then, the glass dielectric film 13b is adhered to the low voltage electrode 7 by means of an adhesive 13b2.

Embodiment 8

Figure 16:
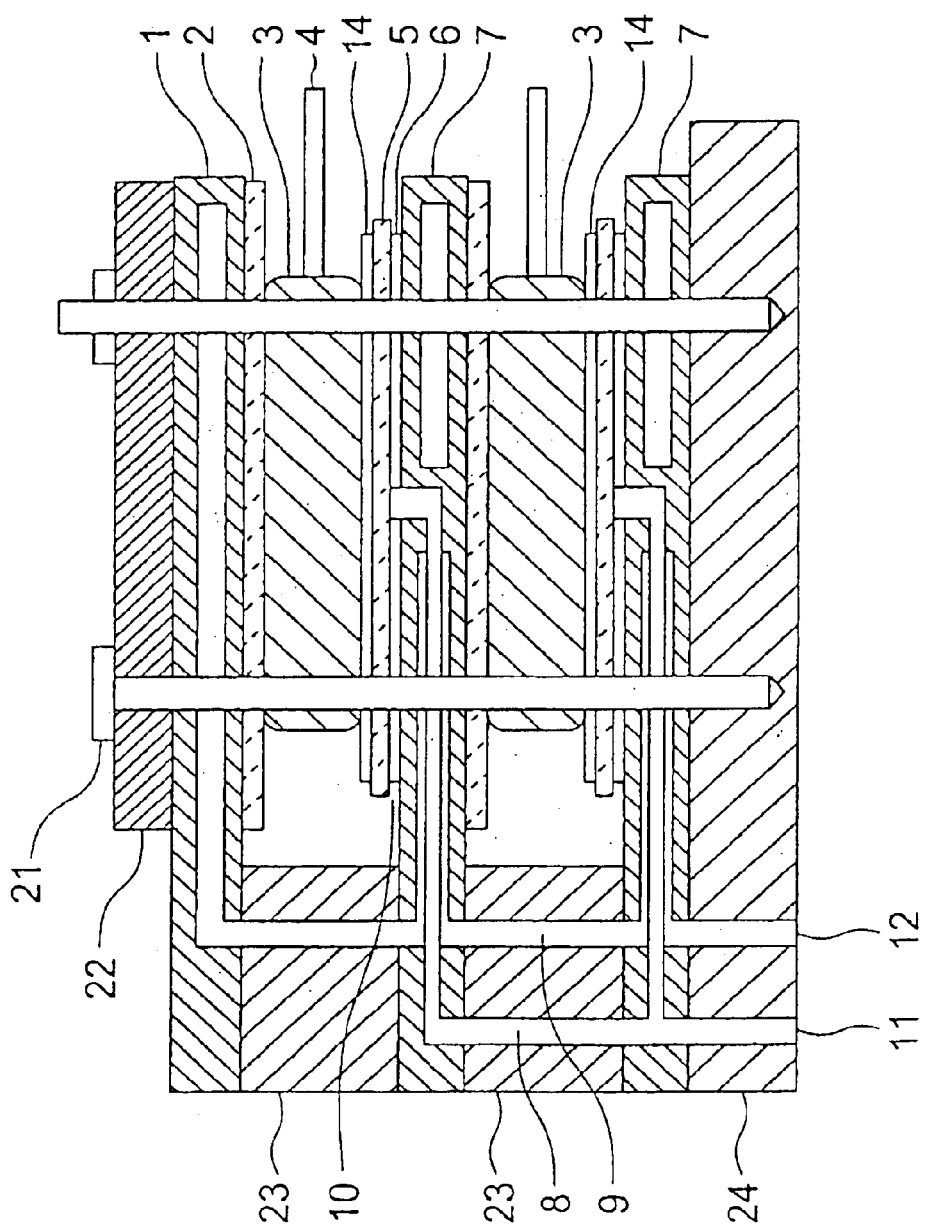
FIG. 16 is a detailed cross sectional drawing of an ozonizer electrode of an ozonizer of an Embodiment 8 of the present invention.

FIG. 16 is a detailed cross sectional drawing of an ozonizer electrode of an ozonizer of an Embodiment 8 of the present invention. In the present embodiment, a main surface of the dielectric 5 at the high voltage electrode 3 side is covered all over with a conductive film 14.

In a case where the conductive film 14 is not provided, when a surface of the high voltage electrode 3 and a surface of the dielectric 5 are pressed together by mechanical pressure only without using an adhesive or the like, the surface of the high voltage electrode 3 and surface of the dielectric 5 cannot be closely contacted. A gap develops in one portion of a contact surface(s) and an improper discharge (local discharge) occurs in this gap. This improper discharge is a problem in that it damages the dielectric 5, degrades the ozone generating efficiency and interferes with the generation of clean ozone.

In the present embodiment, by applying the conductive film 14 on the surface of the dielectric 5, even if, for example, the contact surfaces cannot be completely closely joined and a gap develops in one portion of the contact surfaces, since the conductive film 14 of the dielectric 5 and high voltage electrode 3 have the same electric potential, it is possible to prevent an improper discharge, and it is possible to prevent the occurrence of metallic contamination.

Embodiment 9

Figure 17:
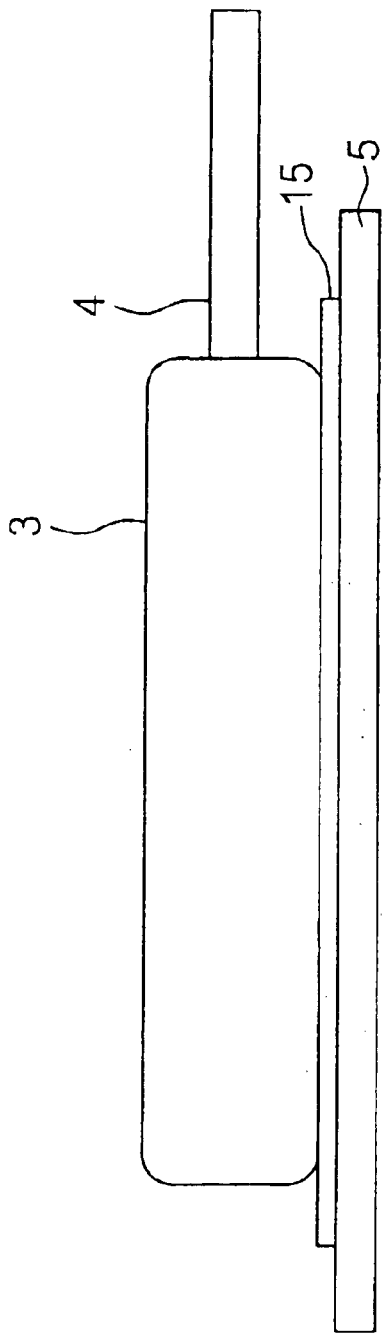
FIG. 17 is a side elevation of a high voltage electrode and a dielectric of an ozonizer of an Embodiment 9 of the present invention.

FIG. 17 is a side elevation of a high voltage electrode 3 and a dielectric 5 of an ozonizer of an Embodiment 9 of the present invention. In the present embodiment, the high voltage electrode 3 and dielectric 5 are joined together so that there are no gaps there-between by means of a conductive adhesive. In this sort of construction as well, it is possible to increase adhesion between the high voltage electrode 3 and dielectric 5, an improper discharge may be prevented and it is possible to prevent the occurrence of metallic contamination. Furthermore, positioning adjustments and the like are unnecessary and assembly is facilitated.

Embodiment 10

Figure 18A:
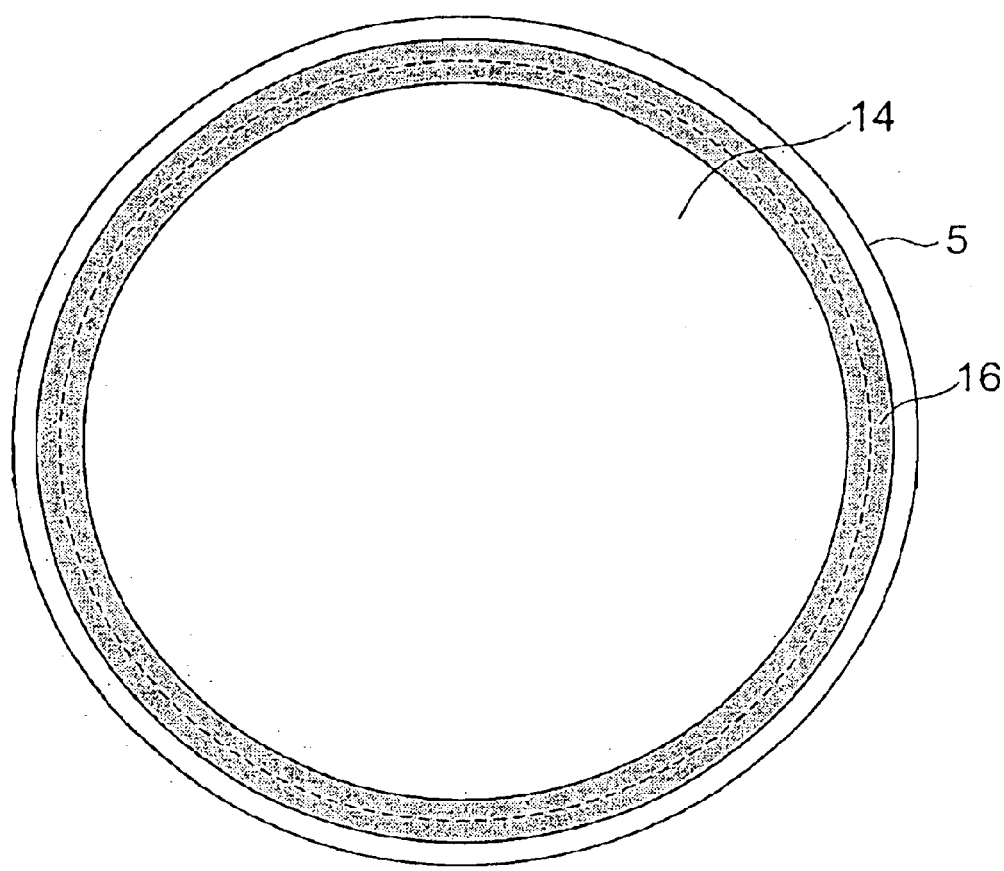
FIG. 18 is a drawing of a dielectric, as viewed from the top and as viewed from the side, of ozonizer of an Embodiment 10 of the present invention.
Figure 18B:
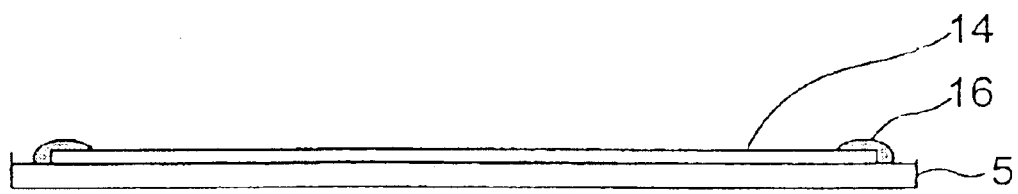

FIG. 18 is a drawing of a dielectric 5, as viewed from the top and as viewed from the side, of ozonizer of an Embodiment 10 of the present invention. The present embodiment includes a metallic contamination suppressing construction at an edge portion of the conductive film 14. When a high voltage electric potential is applied to the conductive film 14, an abnormal corona discharge occurs at an edge portion thereof. This abnormal corona discharge causes metallic contamination. In the present embodiment, an insulating film 16 is coated all around a portion formed by a step of an outer circumferential portion of the conductive film 14. Hence, it is possible to prevent the abnormal corona discharge from occurring at the edge portion and it is possible to prevent the occurrence of metallic contamination.

Other constructions are similar to Embodiment 8.

Embodiment 11

Figure 19:
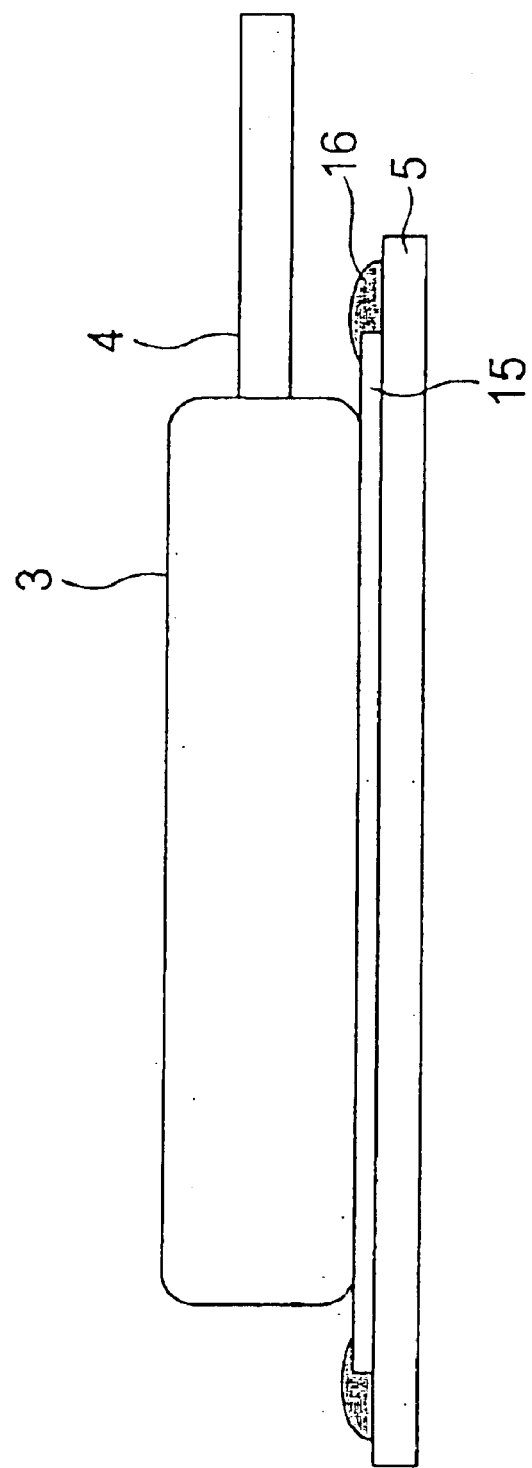
FIG. 19 is a side elevation of a high voltage electrode 3 and a dielectric 5 of an ozonizer of an Embodiment 11 of the present invention.

FIG. 19 is a side elevation of a high voltage electrode 3 and a dielectric 5 of an ozonizer of an Embodiment 11 of the present invention. In the present embodiment, an insulating film 16 is coated all around a portion formed by a step of an outer circumferential portion of the conductive adhesive 15. Thus, it is possible to prevent the abnormal corona discharge from occurring at the edge portion of the conductive adhesive 15 and it is possible to prevent the occurrence of metallic contamination.

Other constructions are similar to Embodiment 9.

Embodiment 12

In the present embodiment, an outside diameter of the high voltage electrode 3 is smaller than an outside diameter of the dielectric 5 and smaller than an outside diameter of the conductive film 14 provided on a surface of the dielectric 5. Other constructions are similar to Embodiment 8.

By making the outside diameter of the high voltage electrode 3 smaller than the outside diameter of the dielectric 5 and the conductive film 14, the abnormal corona discharge is done away with and metallic contamination may be prevented. In a case where the outside diameter of the conductive film 14 is smaller than the high voltage electrode 3, a discharge occurs between the high voltage electrode 3 and dielectric 5 and causes metallic contamination.

Embodiment 13

Figure 20:
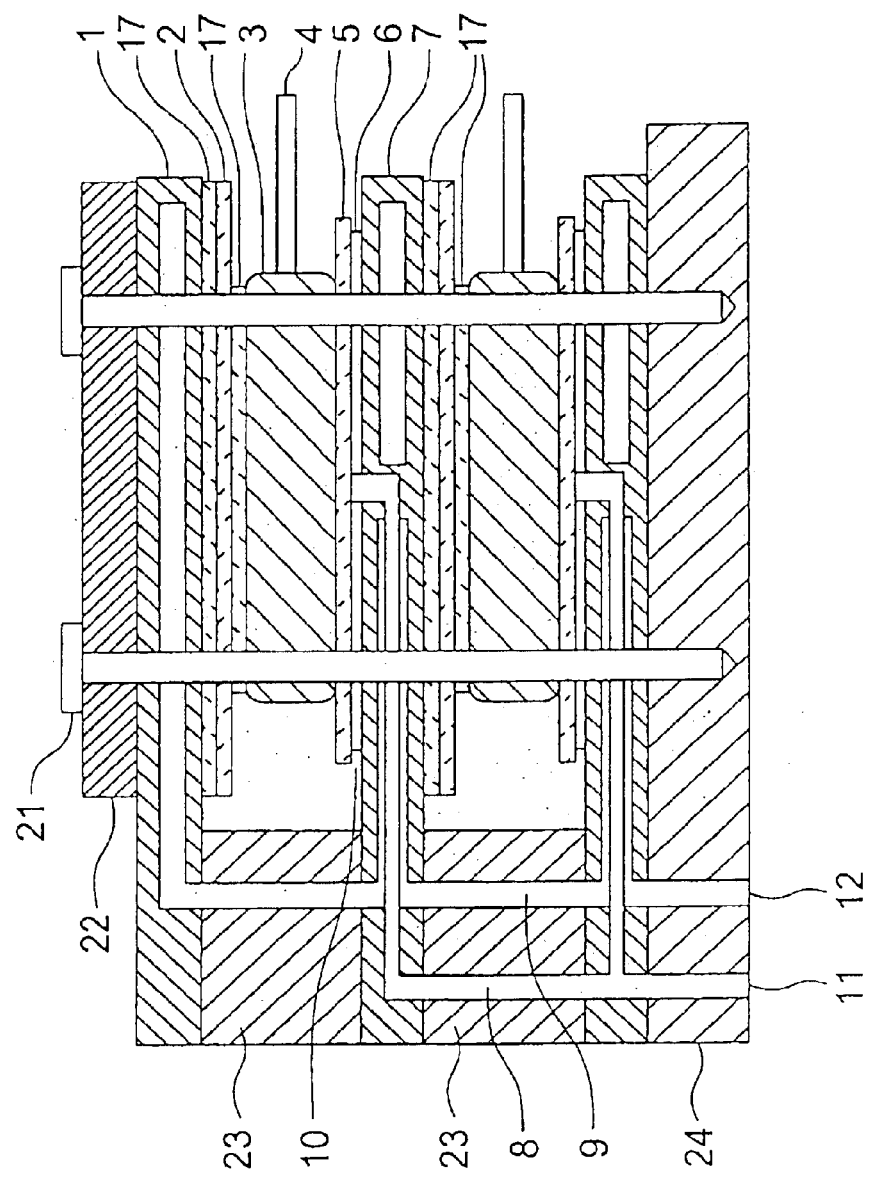
FIG. 20 is a detailed cross sectional drawing of an ozonizer electrode of an ozonizer of an Embodiment 13 of the present invention.

FIG. 20 is a detailed cross sectional drawing of an ozonizer electrode of an ozonizer of an Embodiment 13 of the present invention. In the present embodiment, thermal conductive sheets 17, each made of a material having excellent elasticity and high thermal conductivity, for example, silicon gum and the like, are sandwiched between the high voltage electrode 3 and the thermal conducting/electric insulating sheet 2 and the low voltage electrode 7 and the thermal conducting/electric insulating sheet 2. Other constructions are similar to Embodiment 1.

In cooling a high voltage portion, heat generated from the high voltage electrode 3 is let off from the low voltage electrode 7 via the thermal conducting/electric insulating sheet 2. Moreover the uppermost (high voltage electrode 3) is cooled by means of the electrode cooling sheet 1. Depending on the manufacturing precision of each contact surface of the high voltage electrode 3, electrode cooling sheet 1 and thermal conducting/electric insulating sheet 2, it is possible for a gap to occur between the high voltage electrode 3 and the thermal conducting/electric insulating sheet 2 and the low voltage electrode 7 and the thermal conducting/electric insulating sheet 2 and the electrode cooling sheet 1 and the thermal conducting/electric insulating sheet 2. The existence of the gap of oxygen gas of extremely low thermal conductivity greatly increases thermal resistance. Thus, this gap must be eliminated in order for cooling of the high voltage electrode 3 to be efficiently performed.

Since the thermal conductive sheets 17 of the present embodiment are made of a material having excellent elasticity and high thermal conductivity, a gap occurring due to an variance in manufacturing precision may be eliminated, the generated heat of the high voltage electrodes may be transferred to the low voltage electrode 7 or the electrode cooling sheet 1 and the temperature of the high voltage electrode 3 may be favorably lowered.

Accordingly, in the present embodiment, minute gaps between the high voltage electrode 3 and the thermal conducting/electric insulating sheet 2 and the electrode cooling sheet 1 and the thermal conducting/electric insulating sheet 2 are eliminated, it is possible to eliminate minute gaps which degrade thermal conductivity, the thermal conductivity between the high voltage electrode 3 and cooling sheet 1 is improved, the cooling efficiency of the discharge gaps 6 is improved, the temperature of the discharge gaps 6 may be favorably lowered and the ozone generating efficiency is improved. Furthermore, because the thermal conductive sheets 17 have elasticity, there is also an excellent gas shielding effect by pressing from both sides with a predetermined pressure.

Moreover, the thermal conductive sheet 17 is not limited to silicon gum, the stated effects may be obtained as long as it is a material having excellent elasticity and high thermal conductivity.

Embodiment 14

Figure 21:
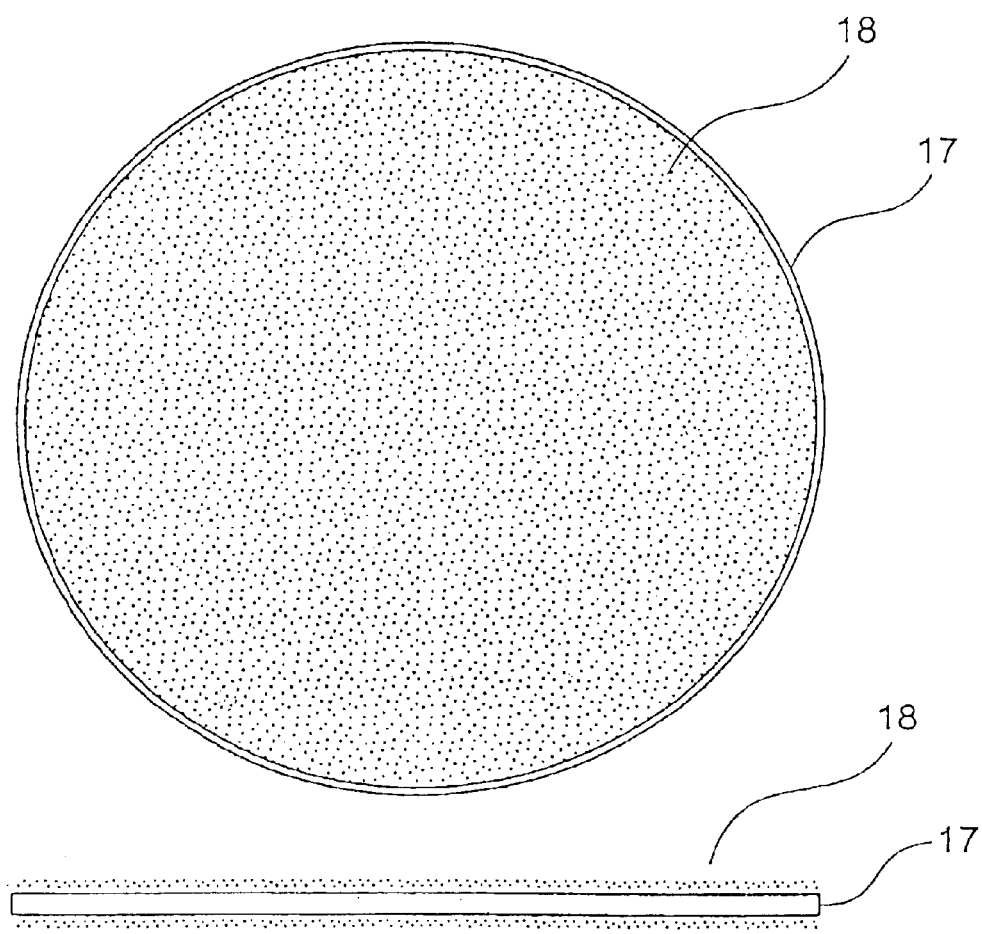
FIG. 21 is a drawing of a thermal conducting sheet, as viewed from the top and as viewed from the side, of ozonizer of an Embodiment 14 of the present invention.

FIG. 21 is a drawing of a thermal conducting sheet 17, as viewed from the top and as viewed from the side, of ozonizer of an Embodiment 14 of the present invention. In the thermal conducting sheet 17 of the present embodiment, a ceramic powder 18 is applied all over both main surfaces thereof. Other constructions are the same as in Embodiment 13.

It is necessary that thermal conducting sheet 17 be elastic, have excellent thermal conductivity, and excellent workability. In this regard, silicone gel is an optimal material. Silicone gel has high tackiness and where it is applied between the high voltage electrode 3 and the thermal conducting/electric insulating sheet 2 and electrode cooling sheet 1, there is a problem in production in that air bubbles (minute air gaps) are entrapped at a contact surface. As stated above, cooling efficiency is degraded when gaps develop. In order to resolve this problem, in the present embodiment, the ceramic powder 18 is applied to the thermal conducting sheet 17. The tackiness of the sheet is eliminated when ceramic powder 18 is lightly sprayed on to the tacky sheet. Thus, the thermal conducting sheet 17 may be easily applied without bubbles developing.

Accordingly, in the present embodiment, since a silicon gel having the ceramic powder 18 applied to a surface thereof is used as the thermal conducting sheet 17 of Embodiment 13, the tackiness of the thermal conducting sheet 17 is suppressed, air bubbles may be easily eliminated between the high voltage electrode 3 and thermal conducting/electric insulating sheet 2 and electrode cooling sheet 1, mounting of the thermal conducting sheet 17 is facilitated and it is possible to provide a low-cost ozonizer.

Embodiment 15

Figure 22:
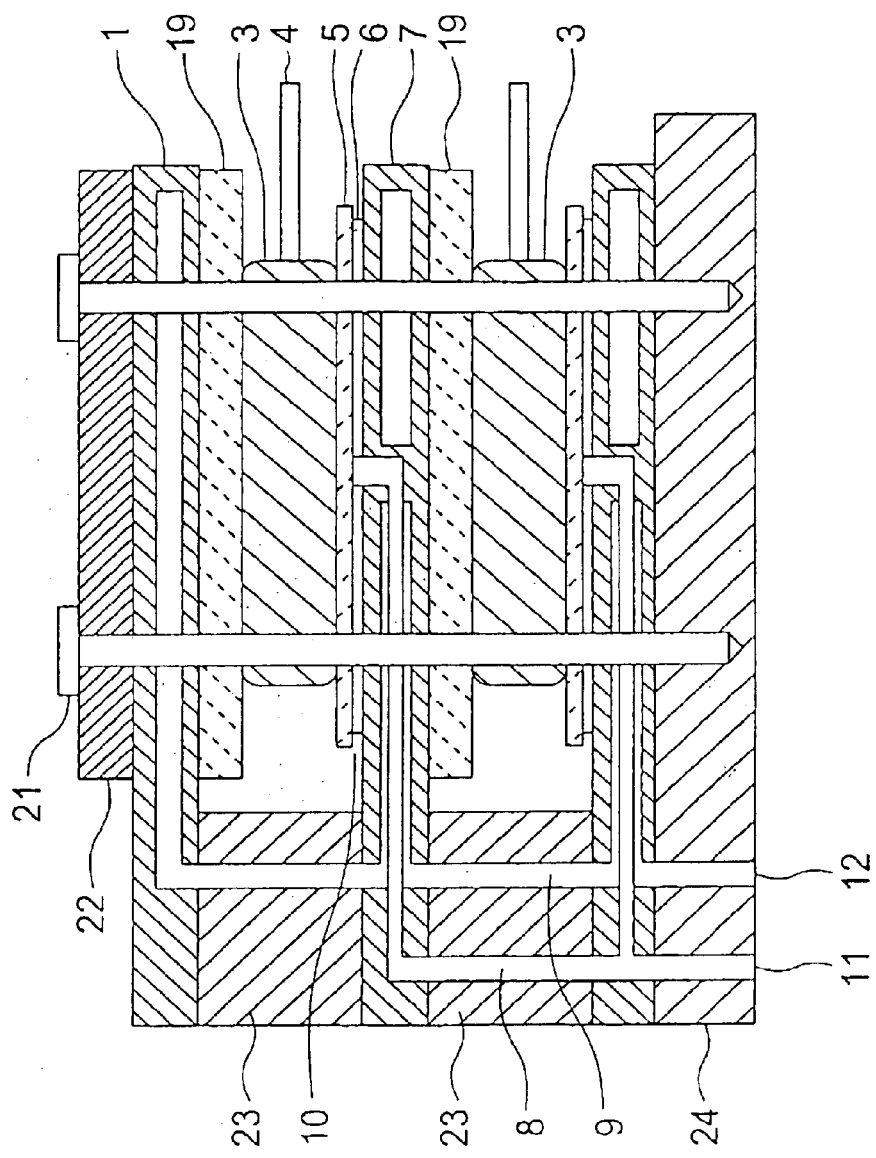
FIG. 22 is a detailed cross sectional drawing of an ozonizer electrode of an ozonizer of an Embodiment 15 of the present invention.

FIG. 22 is a detailed cross sectional drawing of an ozonizer electrode of an ozonizer of an Embodiment 15 of the present invention. In the present embodiment, a thermal conducting/electric insulating sheet 19 made of a material having excellent elasticity and high thermal conductivity, for example, silicon gum and the like is sandwiched between the high voltage electrode 3 and the electrode cooling sheet 1. That is, the thermal conducting/electric insulating sheet 19 is sandwiched between the high voltage electrode 3 and the electrode cooling sheet 1 instead of the thermal conducting/electric insulating sheet 2 of Embodiment 1.

The functions sought for the material between the high voltage electrode 3 and the electrode cooling sheet 1 are an insulating function capable of insulating (against) high voltage electricity and a thermal conducting function for efficiently transferring heat. In addition to these two characteristics the thermal conducting/electric insulating sheet 19 of the present embodiment also has excellent flexibility. Gaps may be eliminated between the high voltage electrode 3 and the electrode cooling sheet 1, heat of the high voltage electrode 3 may be transferred to the electrode cooling sheet 1 and a temperature of the high voltage electrode 3 may be favorably lowered. In addition, the thermal conducting/electric insulating sheet 2 of Embodiment 1 may be omitted, and it is possible to reduces the number of components and reduce size and cost.

Namely, in the present embodiment, in the ozonizer of Embodiment 1, since the construction is such that the thermal conducting/electric insulating sheet 19 of excellent elasticity and having an insulating function and thermal conducting function is sandwiched between the high voltage electrode 3 and the electrode cooling sheet 1 instead of the thermal conducting/electric insulating sheet 2, it is possible to reduce by one (1) the three (3) components, i.e., the thermal conducting sheet 17, the thermal conducting/electric insulating sheet 2 and the thermal conducting sheet 17 and the cost of the apparatus may be reduced.

Embodiment 16

Figure 23:
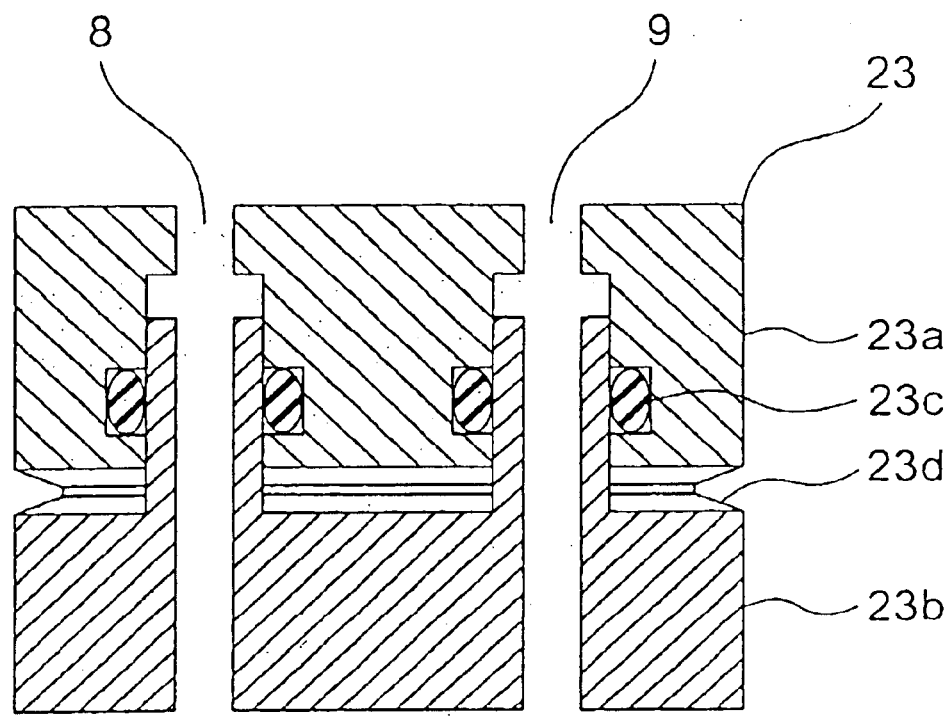
FIG. 23 is a cross sectional drawing of a manifold block of an ozonizer of an Embodiment 16 of the present invention.

FIG. 23 is a cross sectional drawing of a manifold block 23 of an ozonizer of an Embodiment 16 of the present invention. The manifold block 23 is divided into two (2) members in a laminating direction, that is, an upper manifold block 23a and a lower manifold block 23b. An ozone gas passage 8 and cooling water passage 9 are formed in both so as to pass therethrough in a laminating direction. The ozone gas passage(s) 8 and cooling water passage(s) 9 are connected to the ozone gas passages 8 and cooling water passages 9 provided in the high voltage electrode 7 and electrode cooling sheet 1.

Cylindrical portions which extend toward the top-side of the drawing and provided so as to enclose the ozone gas passage 8 and cooling water passage 9 are formed on the lower manifold block 23b. On the other hand, the upper manifold block 23a includes concave portions into which these cylindrical portions are inserted. The ozone gas passage 8 and cooling water passage 9 are formed in a central portion of these concave portions. The cylindrical portions and concave portions are engaged having a gap which allows for sliding in the laminating direction, so as to have a cylinder and piston relationship. O-rings 23c for maintaining air-tightness are disposed between the cylindrical portions and concave portions. Also, a disc spring 23d is disposed between the upper manifold block 23a and lower manifold block 23b so as to have elasticity in the laminating direction. The manifold blocks 23 of the present invention, being of such a construction, include passages extending in the laminating direction connected to the ozone gas passages 8 and cooling water passages 9 provided in the low voltage electrode 7 and electrode cooling sheet 1 and may expand and contract in the laminating direction of the electrodes.

As mentioned in Embodiment 1 for instance, the precision of the discharge gap 6 must be increased in order to improve ozone generating efficiency. Hence, the precision of the discharge gaps 6 is improved by increasing the height-precision of the discharge gap forming spacers and fastening the electrode as a whole to the base 24 by means of the presser plate 22 and the fastening bolts 21. Nevertheless, the low voltage electrode 7 and electrode cooling sheet 1 are provided adjacent to the manifold block 23 and an adverse influence acts on the electrode fastening when there is a strong joining strength with the manifold block 23 and there is a concern that the precision of the discharge gaps 6 will not be maintained.

Namely, in Embodiment 2 and with reference to FIG. 2, starting with the high voltage electrode 3 and low voltage electrode 7 many members are laminated and fastened to the base 24 by means of the fastening bolts 21. In this laminate, the discharge gaps 6 are formed by discharge gap forming spacers. Meanwhile, since many members are laminated in the laminate, errors in each of the members accumulate and a certain error develops in the longitudinal direction. The electrode cooling sheet 1 and low voltage electrode 7 are, for example, rigid bodies made of stainless steel and the like. Thus, no matter how precisely the block sandwiched between the electrode cooling sheet 1 and low voltage electrode 7 is manufactured, the electrode cooling sheet 1 and low voltage electrode 7 are distorted by the error in the longitudinal direction of the laminate. The occurrence of this distortion makes it impossible to precisely form the discharge gaps 6. In comparison, the manifold block 23 of the present embodiment is of construction having elasticity in the laminating direction of the electrodes. Thus, an error in the longitudinal direction of the laminate may be absorbed and it is possible to precisely form the discharge gaps 6.

Accordingly, in the present embodiment, because there is provided the manifold block 23 formed with the cooling water passage 9 or ozone gas passage 8 connected to the cooling water passages 9 or ozone gas passages 8 provided in each electrode, respectfully, the space provided for piping for cooling water and for piping for deriving ozone gas may be reduced, and it is possible decrease the size of the apparatus, reduce the weight and reduce the number of components and it is possible to provide for increased quality of the apparatus.

Also, the manifold block 23 of the present embodiment is of a construction having elasticity in the laminating direction of the electrodes. Thus, it is possible to eliminate the adverse influence on the gap length of the discharge gap caused by the fastening of the manifold block 23 and the precision of the discharge gaps may be improved.

Embodiment 17

Figure 24:
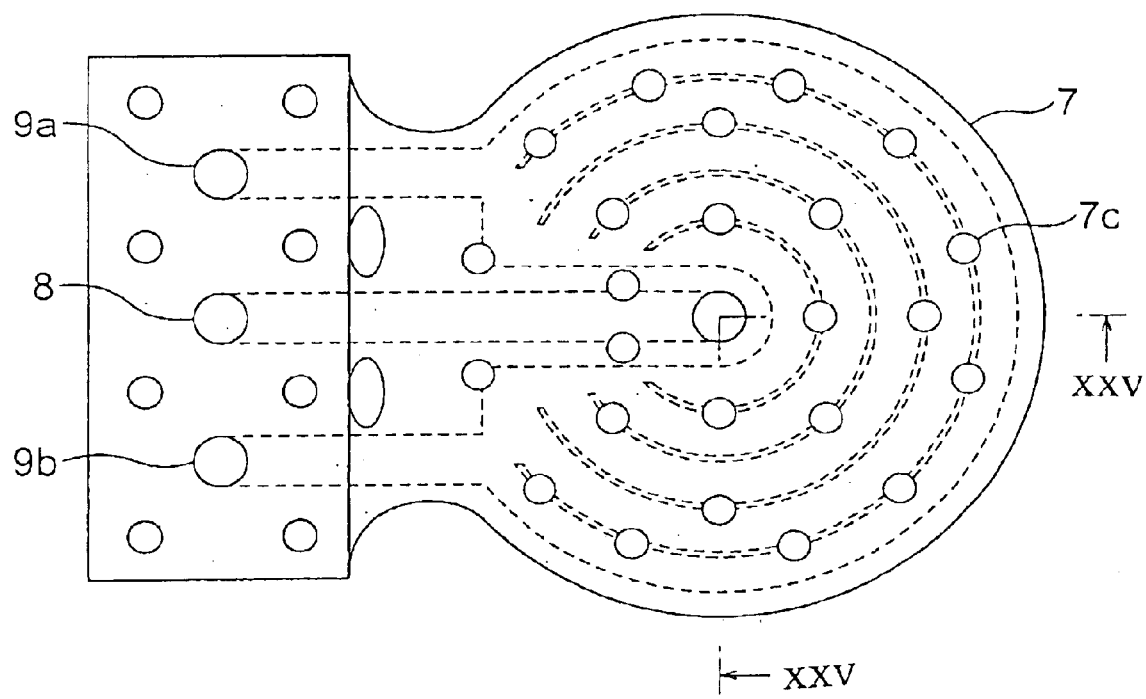
FIG. 24 is a top view of a low voltage electrode of an ozonizer of an Embodiment 17 of the present invention.
Figure 25:
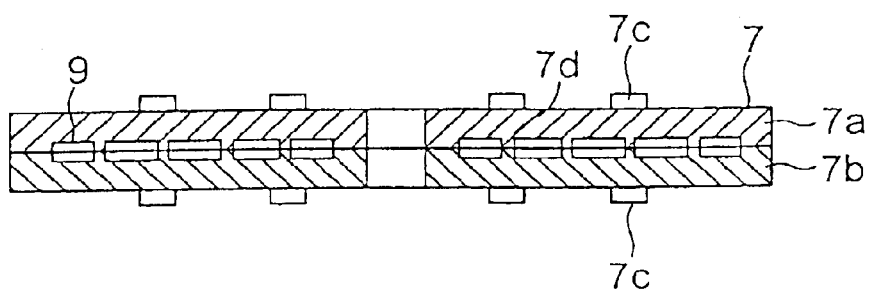
FIG. 25 is cross sectional perspective view taken along the line I—I in FIG. 24.

FIG. 24 is a top view of a low voltage electrode 7 of an ozonizer of an Embodiment 17 of the present invention. FIG. 25 is cross sectional perspective view taken along the line I—I in FIG. 24. The present embodiment relates to disposition of discharge gap spacers 7c. Grooves of several mm in depth are formed by etching or machining in advance one main surface of two electrodes 7a, 7b. These grooves are lined up to form an ozone gas passage 8 and cooling water passage(s) 9. Ribs 7d for separating passages are provided between adjacent grooves. The discharge gap spacers 7c of the present embodiment are disposed at a position opposite the ribs 7d. That is to say, the discharge gap spacer(s) 7c is disposed on a surface of the low voltage electrode 7 facing the discharge gap 6 at a position which passes through the rib 7d in the laminating direction.

Cooling water passages 9 are formed around an entire surface inside the low voltage electrode 7. A thickness of the ribs 7d for separating the passages is made as thin as possible in order to increase a surface area of the cooling water passages 9 even a little. On the other hand, a diameter of the discharge gap spacers 7c for forming the discharge gaps 6 is preferably as small as possible to increase the discharge gaps 6. The low voltage electrode 7 is, as a whole, a thin rigid body made of stainless steel and the like and in a case where pressure increases in the laminating direction, although the portions having the ribs 7d are strong against deformation, the locations without the ribs 7d are weak. That is, they are recessed. Since the discharge gap spacers 7c of the present embodiment are disposed at a position opposite the ribs 7d, there is accordingly almost no deformation of the low voltage electrode 7. Consequently, deformation of the discharge gaps 6 may be suppressed and it is possible to form highly precise discharge gaps 6.

Accordingly, in the present embodiment, the discharge gap spacers 7c are disposed at positions opposite the ribs 7d forming the cooling water passages 9 of the low voltage electrode 7. Thus, the low voltage electrode 7 is not deformed and the adverse influence on the discharge gaps 6 due to fastening the electrodes may be eliminated and the ozone generating efficiency increased.

Embodiment 18

Figure 26:
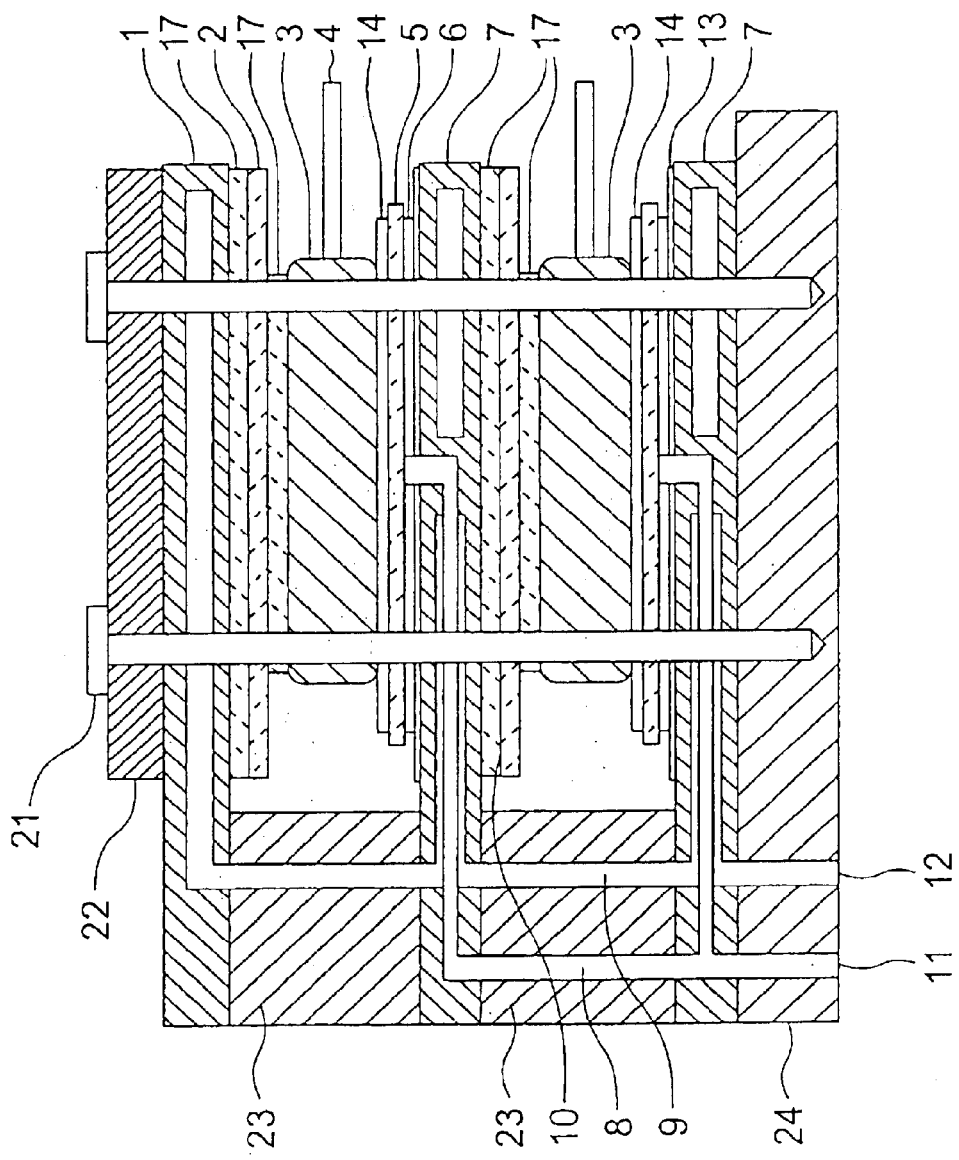
FIG. 26 is a detailed cross sectional drawing of an ozonizer electrode of an ozonizer of an Embodiment 18 of the present invention.
Figure 27:
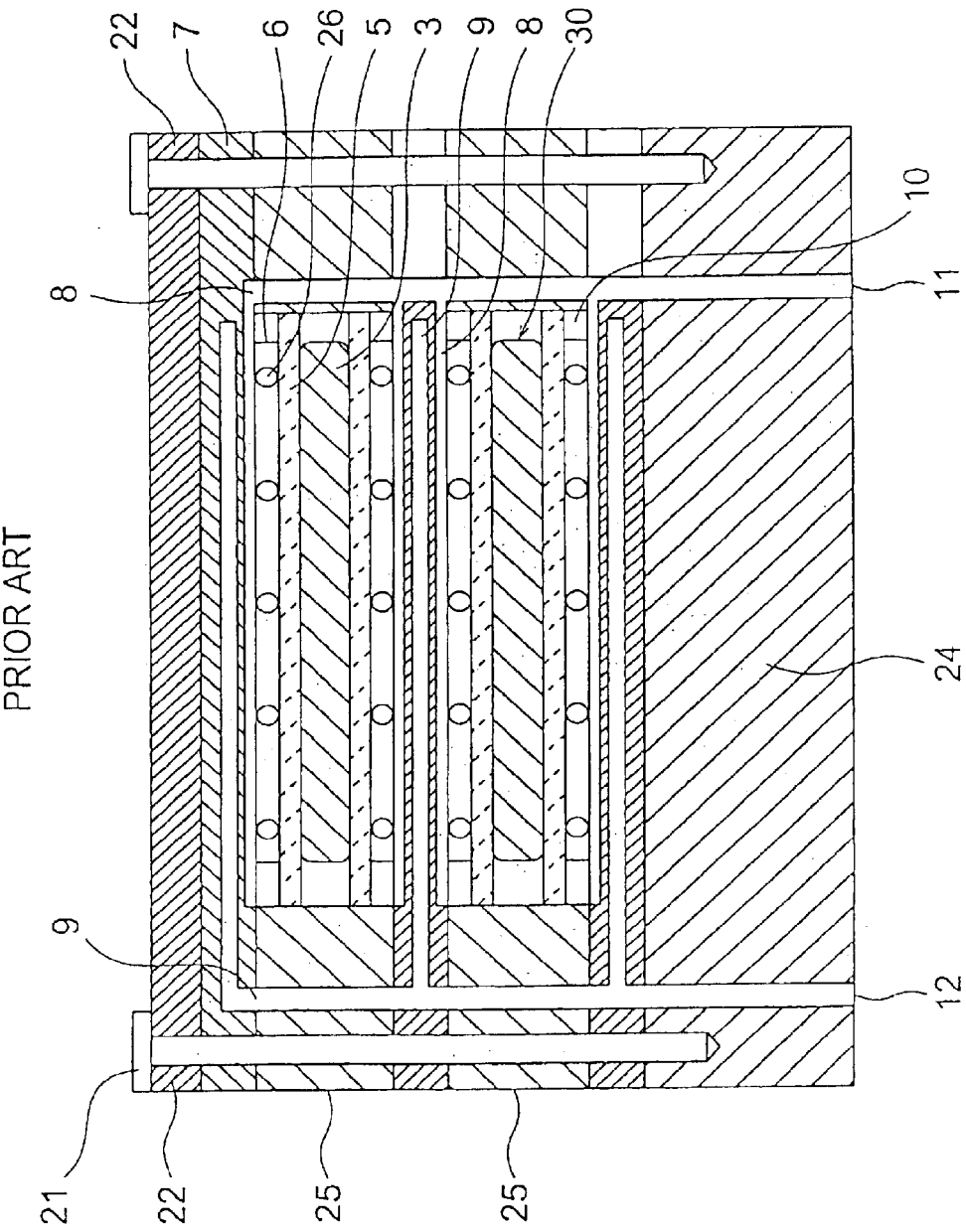
FIG. 27 is a cross sectional drawing of a conventional ozonizer.

FIG. 26 is a detailed cross sectional drawing of an ozonizer electrode of an ozonizer of an Embodiment 18 of the present invention. The present embodiment includes the construction of Embodiment 5 wherein the entire discharge surface of the low voltage electrode 7 facing the discharge gap 6 is covered with the dielectric film 13 of an inorganic material, the construction of Embodiment 8 wherein the main surface of the dielectric 5 at the high voltage electrode 3 side is covered all over with the conductive film 14 and the construction of Embodiment 13 in which the thermal conductive sheet 17 is sandwiched between each of the high voltage electrode 3, thermal conducting/electric insulating sheet 2 and the electrode cooling sheet 1.

Hence, it is possible to form discharge gaps 6 for generating clean ozone in which metallic contamination does not develop and the cooling efficiency of the discharge gaps 6 may be improved.

Embodiment 19

The present embodiment will be explained using FIGS. 1 and 2. In an ozonizer electrode 101 of the present embodiment, a total of eight (8) electrode modules 102 comprising, as shown in FIG. 2, a flat plate-shaped low voltage electrode 7, a flat plate-shaped high voltage electrode 3 facing a main surface of the low voltage electrode 7, a flat plate-shaped dielectric 5 and a spacer (not shown) for forming a discharge gap 6 of a thin thickness in a laminating direction provided between the low voltage electrode 7 and the high voltage electrode 3, an electrode cooling sheet 1 provided facing a main surface of the high voltage electrode 3 at a side opposite the discharge gap 6 for cooling the high voltage electrode 3, and a thermal conducting/electric insulating sheet 2 sandwiched between the high voltage electrode 3 and the electrode cooling sheet 1, are laminated as shown in FIG. 1, i.e., N-1, N-2, N-3 . . . N-7, N-8.

Accordingly, since, in the present embodiment, a plurality of electrode modules are laminated, it is possible to increase the capacity of the apparatus while yet making it compact.

Moreover, although a total of eight (8) electrode modules are laminated in the present embodiment, the number of modules is not limited to eight (8) and similar effects may be obtained by laminating another number.

According to one aspect of the present invention there is provided an ozonizer comprising:

a flat plate-shaped low voltage electrode;

a flat plate-shaped high voltage electrode facing a main surface of the low voltage electrode;

a flat plate-shaped dielectric and a spacer for forming a discharge gap of a thin thickness in a laminating direction provided between the low voltage electrode and the high voltage electrode;

an electrode cooling sheet provided facing a main surface of the high voltage electrode at a side opposite the discharge gap for cooling the high voltage electrode;

a thermal conducting/electric insulating sheet sandwiched between the high voltage electrode and the electrode cooling sheet; and an alternating voltage is applied between the low voltage electrode and the high voltage electrode and a discharge is produced in the discharge gap injected with oxygen gas to produce ozone gas. Thus, the cooling efficiency of the discharge gaps is improved and the temperature of the discharge gaps may be satisfactorily reduced. Accordingly, power density may be increased without decreasing ozone generating efficiency, and size reduction and cost reduction may be provided for an apparatus in which it is possible to reduce the number of electrode modules. Further, since the high voltage electrodes are cooled via the thermal conducting/electric insulating sheets, standard service water may be used as cooling water without using ion exchanged water and the like of small electric conductivity. Thus, an electric conductivity monitoring device or ion exchanged water circulating equipment and the like is unnecessary and, by reducing the number of apparatus components, it is possible provide for cost reductions or reduce maintenance costs.

According to another aspect of the present invention there is provided an ozonizer wherein, an ozone gas passage and a cooling water passage are formed inside the low voltage electrode by adhering together two or more metal flat plates formed with grooves on main surfaces thereof so that the grooves line up. Hence, it is possible to decrease the thickness of the low voltage electrode and reduce the size of the apparatus. Furthermore, since piping for deriving cooling water and ozone is unnecessary, assembly and disassembly may be simply performed and a low cost ozonizer may be provided.

According to another aspect of the present invention there is provided an ozonizer wherein, a cooling water passage is formed in the electrode cooling sheet by adhering together two or more metal flat plates formed with grooves on main surfaces thereof so that the grooves line up. Thus, it is possible to decrease the thickness of the electrode cooling sheet and reduce the size of the apparatus. Furthermore, since piping for deriving cooling water and ozone is unnecessary, assembly and disassembly may be simply performed and a low cost ozonizer may be provided.

According to another aspect of the present invention there is provided an ozonizer wherein, the flat metal plates are adhered together by heat and pressure only.

Thus, ozone caused corrosion of the bonding agent does not occur and it is possible to realize an ozonizer having a long life and high reliability.

According to another aspect of the present invention there is provided an ozonizer wherein, both main surfaces of the low voltage electrode facing the discharge gap are covered in an inorganic dielectric film. Hence, the discharge gap constructed so as to be completely sandwiched with the inorganic material, and metallic contamination caused by metal sputtering in a discharge may be suppressed and it is possible to provide an ozonizer which generates clean ozone gas.

According to another aspect of the present invention there is provided an ozonizer wherein, the dielectric film is made of a ceramic material. Hence, the ceramic dielectric film may be formed by a thermal spraying technique and thickness thereof controlled to several $\mu$m. Further, in accordance with this thermal spraying technique, it is also possible to form the ceramic dielectric discharge gap spacers concurrently.

According to another aspect of the present invention there is provided an ozonizer wherein, the dielectric film is made of a glass material. Thus, the dielectric film may be easily formed by adhering a glass plate of a quartz material to the low voltage electrode by means of an adhesive. Also, the convex glass dielectric discharge gap spacers may be easily formed by means of a shot blasting treatment using a mask prior to adhering the glass plate to the low voltage electrode.

According to another aspect of the present invention there is provided an ozonizer wherein, a main surface of the dielectric facing the high voltage electrode is coated with a conductive film having conductive properties, and the conductive film contacts the high voltage electrode. Hence, by applying the conductive film on the surface of the dielectric and contacting this conductive film covered surface and the high voltage electrode, even if, a gap occurs between the conductive film and the high voltage electrode, the conductive film and high voltage electrode have the same electric potential and a local discharge may be prevented, and it is possible to prevent the occurrence of metallic contamination. Furthermore, since the high voltage electrode and conductive film may be joined by simple pressure welding, assembly and disassembly may be facilitated and there is also an advantageous effect in that components may be recycled.

According to another aspect of the present invention there is provided an ozonizer wherein, the dielectric and the high voltage electrode are adhered by means of a conductive adhesive. Thus, gaps between the dielectric and high voltage electrode may be eliminated a local discharge may be prevented and it is possible to prevent the occurrence of metallic contamination.

According to another aspect of the present invention there is provided an ozonizer wherein, a peripheral edge portion of the conductive film is coated with an inorganic insulating film. Hence, it is possible to suppress the abnormal corona discharge from occurring at the peripheral edge portion of the conductive film and the occurrence of metallic contamination may be prevented.

According to another aspect of the present invention there is provided an ozonizer wherein, a peripheral edge portion of the conductive adhesive is coated with an inorganic insulating film. Thus, it is possible to suppress the abnormal corona discharge from occurring at the peripheral edge portion of the conductive adhesive and the occurrence of metallic contamination may be prevented.

According to another aspect of the present invention there is provided an ozonizer wherein, an outside diameter of the high voltage electrode is smaller than that of the dielectric. Thus, it is possible to eliminate the abnormal corona discharge and prevent the occurrence of metallic contamination. Also, it is possible to suppress damage to the dielectric and an ozonizer having high reliability and a long-life dielectric may be provided.

According to another aspect of the present invention there is provided an ozonizer wherein, an outside diameter of the high voltage electrode is smaller than that of the conductive film covering the dielectric. Thus, it is possible to further eliminate the abnormal corona discharge and prevent the occurrence of metallic contamination. Also, it is possible to further suppress damage to the dielectric and an ozonizer having high reliability and a long-life dielectric may be provided.

According to another aspect of the present invention there is provided an ozonizer wherein, a flexible thermal conducting sheet is sandwiched between the high voltage electrode and the thermal conducting/electric insulating sheet and the thermal conducting/electric insulating sheet and the electrode cooling sheet, contacting each respectively. Hence, minute gaps between the high voltage electrode and the thermal conducting/electric insulating sheet and the electrode cooling sheet and the thermal conducting/electric insulating sheet are eliminated, it is possible to eliminate minute gaps which degrade thermal conductivity, the thermal conductivity between the high voltage electrode and cooling sheet is improved, the cooling efficiency of the discharge gaps is improved, the temperature of the discharge gaps may be favorably lowered and the ozone generating efficiency is improved. Furthermore, because the thermal conductive sheets have elasticity, there is also an excellent gas shielding effect by pressing from both sides with a predetermined pressure.

According to another aspect of the present invention there is provided an ozonizer wherein, the thermal conducting sheet is made of silicon and a ceramic powder is applied to both main surfaces thereof. Thus, the tackiness of the thermal conducting sheet is suppressed, air bubbles may be easily eliminated between the high voltage electrode and thermal conducting/electric insulating sheet and electrode cooling sheet, mounting of the thermal conducting sheet is facilitated and it is possible to provide a low-cost ozonizer.

According to still another aspect of the present invention there is provided an ozonizer comprising:

a flat plate-shaped low voltage electrode;

a flat plate-shaped high voltage electrode is provided facing a main surface of the low voltage electrode;

a flat plate-shaped dielectric and a spacer for forming a discharge gap of a thin thickness in a laminating direction provided between the low voltage electrode and the high voltage electrode;

an electrode cooling sheet provided facing a main surface of the high voltage electrode at a side opposite the discharge gap for cooling the high voltage electrode;

a flexible thermal conducting/electric insulating sheet sandwiched between the high voltage electrode and the electrode cooling sheet; and an alternating voltage is applied between the low voltage electrode and the high voltage electrode and a discharge is produced in the discharge gap injected with oxygen gas to produce ozone gas. Thus, the cooling efficiency of the discharge gaps is improved and the temperature of the discharge gaps may be satisfactorily reduced. Thus, power density may be increased without decreasing ozone generating efficiency, and size reduction and cost reduction may be provided for an apparatus in which it is possible to reduce the number of electrode modules. Further, since the high voltage electrodes are cooled via the thermal conducting/electric insulating sheets, standard service water may be used as cooling water without using ion exchanged water and the like of a small electric conductivity. Thus, an electric conductivity monitoring device or ion exchanged water circulating equipment and the like is unnecessary and, by reducing the number of apparatus components, it is possible provide for cost reductions or reduce maintenance costs.

According to another aspect of the present invention there is provided an ozonizer comprising, a manifold block provided between the low voltage electrode and the electrode cooling sheet, and formed with a cooling water passage connected with cooling water passages provided in the low voltage electrode and the electrode cooling sheet, respectively, or formed with an ozone gas passage connected with the ozone gas passage provided in the low voltage electrode. Hence, the space provided for piping for cooling water and for piping for deriving ozone gas may be reduced, and it is possible decrease the size of the apparatus, reduce the weight and reduce the number of components and it is possible to provide for increased quality of the apparatus.

According to another aspect of the present invention there is provided an ozonizer wherein, the manifold block has an elastic structure with an elastic function in a laminating direction of the low voltage electrode and the high voltage electrode. Thus, it is possible to eliminate the adverse influence on the gap length of the discharge gap due to fastening the manifold block and the precision of the discharge gaps may be improved.

According to another aspect of the present invention there is provided an ozonizer wherein, the spacer is disposed at a position facing a rib forming the cooling water passage of the low voltage electrode. Hence, deformation of the low voltage electrode may be eliminated and, consequently, deformation of the discharge gaps may be suppressed and it is possible to form highly precise discharge gaps.

According to still yet another aspect of the present invention there is provided an ozonizer comprising:

a flat plate-shaped low voltage electrode;

a flat plate-shaped high voltage electrode provided facing both main surfaces of the low voltage electrode;

a flat plate-shaped dielectric and a spacer for forming a discharge gap of a thin thickness in a laminating direction provided between the low voltage electrode and the high voltage electrode;

an electrode cooling sheet provided facing a main surface of the high voltage electrode at a side opposite the discharge gap for cooling the high voltage electrode;

a thermal conducting/electric insulating sheet sandwiched between the high voltage electrode and the electrode cooling sheet;

a manifold block provided between the low voltage electrode and the electrode cooling sheet, and formed with a cooling water passage connected with cooling water passages provided in the low voltage electrode and the electrode cooling sheet, or formed with an ozone gas passage connected with the ozone gas passage provided in the low voltage electrode;

both main surfaces of the low voltage electrode facing the discharge gap are covered in an inorganic dielectric film;

a main surface of the dielectric facing the high voltage electrode coated with a conductive film having conductive properties, and the conductive film contacts the high voltage electrode;

a flexible thermal conducting sheet is sandwiched between the high voltage electrode and the thermal conducting/electric insulating sheet and the thermal conducting/electric insulating sheet and the electrode cooling sheet, contacting each respectively; and an alternating voltage is applied between the low voltage electrode and the high voltage electrode and a discharge is produced in the discharge gap injected with oxygen gas to produce ozone gas. Thus, it is possible to form discharge gaps for generating clean ozone in which metallic contamination does not develop and the cooling efficiency of the discharge gaps 6 may be improved.

According to still yet another aspect of the present invention there is provided an ozonizer wherein, a plurality of electrode modules comprising the low voltage electrode, the high voltage electrode, the dielectric, the spacer, the electrode cooling sheet and the first and second thermal conducting/electric insulating sheet are laminated. Thus, it is possible to change the capacity of the apparatus in accordance with the number of electrode modules which are laminated and the capacity may be easily increased; on the other hand, the apparatus may be made compact even if the capacity is increased.

What is claimed is:

1. An ozonizer comprising:

at least one electrode module, electrode modules being stackable upon each other, each electrode module comprising laminated;

a flat plate-shaped low voltage including a cooling water passage and an ozone passage inside said low voltage electrode;

a flat plate-shaped high voltage electrode facing said low voltage electrode;

a spacer located between said low voltage electrode and said high voltage electrode, defining a discharge gap between said low voltage electrode and said high voltage electrode; and a thermally conducting and electrically insulating sheet disposed on said high voltage electrode;

a manifold block disposed on said low voltage electrode and having passages for circulating water through said cooling water passage and a passage for extracting ozone from said discharge gap through said ozone passage; and an electrode cooling sheet disposed on said thermally conducting and electrically insulating sheet and on said manifold block, at an outermost side of said electrode module, for cooling said high voltage electrode.

2. The ozonizer according to claim 1, wherein said low voltage electrode comprises at least two flat metal plates including grooves and adhered together with the grooves aligned to form said ozone passage and said cooling water passage inside said low voltage electrode.

3. The ozonizer according to claim 2, wherein said spacer is disposed at a position facing a rib forming said cooling water passage of said low voltage electrode.

4. The ozonizer according to claim 1 wherein said electrode cooling sheet comprises at least two flat metal plates including grooves and adhered together with the grooves aligned to form said cooling water passage inside said electrode cooling sheet.

5. The ozonizer according to claim 1 including an inorganic dielectric film covering a main surface of said low voltage electrode facing said discharge gap.

6. The ozonizer according to claim 1 including an electrically conductive film coating a main surface of said dielectric facing said high voltage electrode, wherein said conductive film contacts said high voltage electrode.

7. The ozonizer according to claim 6 including an inorganic insulating film coating a peripheral edge portion of said conductive film.

8. The ozonizer according to claim 1 including a conductive adhesive adhering said dielectric and said high voltage electrode together.

9. The ozonizer according to claim 8 including an inorganic insulating film coating a peripheral edge portion of said conductive film.

10. The ozonizer according to claim 9, wherein said high voltage electrode has a diameter smaller than an outside diameter of said conductive film covering said dielectric.

11. The ozonizer according to claim 1, wherein said high voltage electrode has an outside diameter smaller than an outside diameter of said dielectric.

12. The ozonizer according to claim 1 including a flexible thermally conducting sheet sandwiched between said high voltage electrode and said thermally conducting and electrically insulating sheets and said thermally conducting and electrically insulating sheet and said low voltage electrode or said electrode cooling sheet, contacting each of said high voltage electrode, said thermally conducting and electrically insulating sheet, and said electrode cooling sheet, respectively.

13. The ozonizer according to claim 12, wherein said flexible thermally conducting sheet is a silicone coated with a ceramic powder on major surfaces of said flexible thermally conducting sheet.

14. The ozonizer according to claim 1, wherein said manifold block has an elastic structure with an elastic function in the laminating direction of said low voltage electrode and said high voltage electrode.

15. The ozonizer according to claim 14, wherein said manifold block comprises two block pieces stacked in a laminating direction of said electrode module and including said passage for cooling water and said passage for ozone, an expandable joint extending between said two block pieces, and an elastic member disposed between said two block pieces.

16. The ozonizer according to claim 1, including a generator cover filled with oxygen and containing said electrode module, said electrode cooling sheet, and said manifold block, wherein the oxygen is introduced into said discharge gap at a circumferential portion of said discharge gap and the ozone in said discharge gap is extracted from a central portion of said discharge gap.

17. The ozonizer according to claim 1, comprising a first clamp mechanism for clamping said electrode module together, aid a second clamp mechanism, independent of said first clamp mechanism, for clamping said manifold block together.

18. The ozonizer according to claim 17, wherein said flat metal plates are adhered together by heat and pressure only.

19. An ozonizer comprising:
at least one electrode module electrode modules being stackable upon each other, each electrode module comprising laminated;
a flat plate-shaped low voltage electrode including a cooing water passage and an ozone passage inside said low voltage electrode;
a flat plate-shaped high voltage electrode facing said low voltage electrode;
a spacer disposed between said low voltage electrode and said high voltage electrode, defining a discharge gap between said low voltage electrode and said high voltage electrode; and
a thermally conducting and electrically insulating sheet disposed on said high voltage electrode;
a manifold block located on said low voltage electrode and including a passage for circulating water through said cooling water passage in said low voltage electrode and including a passage for extracting ozone from said discharge tap through said ozone passage;
an electrode cooling sheet disposed on said insulating sheet and on said manifold block, at an outermost side of said electrode module for cooling said high voltage electrode.
an inorganic dielectric film covering main surfaces of said low voltage electrode facing said discharge gap;
an electrically conductive film coating a main surface of said dielectric facing said high voltage electrode, wherein said conductive film contacts said high voltage electrode; and
a flexible thermally conducting sheet sandwiched between said high voltage electrode and said thermally conducting and electrically insulating sheet, and said thermally conducting and electrically insulating sheet and said low voltage electrode or said electrode cooling sheet, contacting each of said high voltage electrode, said thermally conducting and electrically insulating sheet, and said electrode cooling sheet, respectively.

* * * * *